United States Patent [19]

Kajimura et al.

[11] Patent Number: 5,394,741
[45] Date of Patent: Mar. 7, 1995

[54] ATOMIC PROBE MICROSCOPE
[75] Inventors: Hiroshi Kajimura, Tokyo; Takao Okada, Hachioji, both of Japan
[73] Assignee: Olympus Optical Co., Ltd., Tokyo, Japan
[21] Appl. No.: 874,528
[22] Filed: Apr. 27, 1992

Related U.S. Application Data

[63] Continuation-in-part of Ser. No. 724,145, Jul. 1, 1991, Pat. No. 5,245,863.

[30] Foreign Application Priority Data

| Jul. 11, 1990 | [JP] | Japan | 2-181469 |
| Jul. 20, 1990 | [JP] | Japan | 2-191988 |
| Oct. 16, 1991 | [JP] | Japan | 3-267875 |

[51] Int. Cl.$^6$ .......................... G01B 7/34; G01B 11/30
[52] U.S. Cl. ...................................... 73/105; 250/306; 356/376
[58] Field of Search .................. 250/306, 307; 73/105; 356/376

[56] References Cited

U.S. PATENT DOCUMENTS

| 4,604,520 | 8/1986 | Pohl. | |
| 4,732,485 | 3/1988 | Morita et al. | 356/376 |
| 4,866,271 | 9/1989 | Ono et al. | |
| 4,914,293 | 4/1990 | Hayashi et al. | 250/306 |
| 4,935,634 | 6/1990 | Hansma et al. | |
| 4,992,659 | 2/1991 | Abraham et al. | 250/306 |
| 4,992,728 | 2/1991 | McCord et al. | 250/307 |
| 5,025,658 | 6/1991 | Elings et al. | |
| 5,055,679 | 10/1991 | Ninomiya et al. | 250/306 |
| 5,142,145 | 8/1992 | Yasutake | 250/306 |
| 5,157,251 | 10/1992 | Albrecht et al. | |
| 5,164,791 | 11/1992 | Kubo et al. | |
| 5,206,702 | 4/1993 | Kato et al. | 250/306 |
| 5,210,410 | 5/1993 | Barrett | 250/306 |

OTHER PUBLICATIONS

Physical Review Letters, vol. 56, No. 9, Mar. 3, 1986, Atomic Force Microscope, G. Binning et al, pp. 930–933.
Physical Review Letters, vol. 49, No. 1, Jul. 5, 1982, Surface Studies by Scanning Tunneling Microscope, G. Binning et al, pp. 57–61.
Proceedings of the IEEE, vol. 70, No. 5, May, 1982, Silicon as a Mechanical Material, Kurt E. Petersen, pp. 420–457.
Appl.Phys.Lett vol. 56, No. 18, Apr. 30, 1990; pp. 1758–1759.
Appl.Phys.Lett vol. 56, No. 21, May 21, 1990; pp. 2100–2101.
Appl.Phys.Lett vol. 53, No. 12, Sep. 19, 1988; pp. 1045–1047.
Appl.Phys.Lett vol. 54, No. 26, Jun. 26, 1989; pp. 2651–2653.
Applied Optics/vol. 29, No. 1, Jan. 1, 1990—pp. 16–18 "Fiber Optic Displacement Sensor with Subangstrom Resolution"; S. Breen et al.
Applied Optics/vol. 28, No. 20, Oct. 15, 1989—4251 & 4487 "NASA Patter"; Charles Braun.

Primary Examiner—Hezron E. Williams
Assistant Examiner—Daniel S. Larkin
Attorney, Agent, or Firm—Frishauf, Holtz, Goodman & Woodward

[57] ABSTRACT

A cantilever has a probe on one side of the end portion and a mirror on the opposite side. The cantilever is fixed to a support member via a piezoelectric element. A semiconductor laser situated above the mirror has a reflection cleavage plane and constitutes a Fabry-Pérot resonator between the mirror and the reflection cleavage plane. The output from the resonator varies in accordance with the amount of displacement of the end portion of the cantilever, that is, the surface configuration of the sample. This variation is detected by a detector via a photodetector. A control circuit controls a driving voltage applied to an XYZ-scanner so as to cancel the variation of the output from the resonator, thereby keeping constant the distance between the tip of the probe and the surface of the sample. The driving voltage provides height data of the sample surface. The driving voltage, along with a position signal relating to the sample surface output from the XYZ-scanner, is supplied to an image forming unit. The image forming unit generates a three-dimensional image representing the surface configuration of the sample, on the basis of the input voltage and signal.

27 Claims, 14 Drawing Sheets

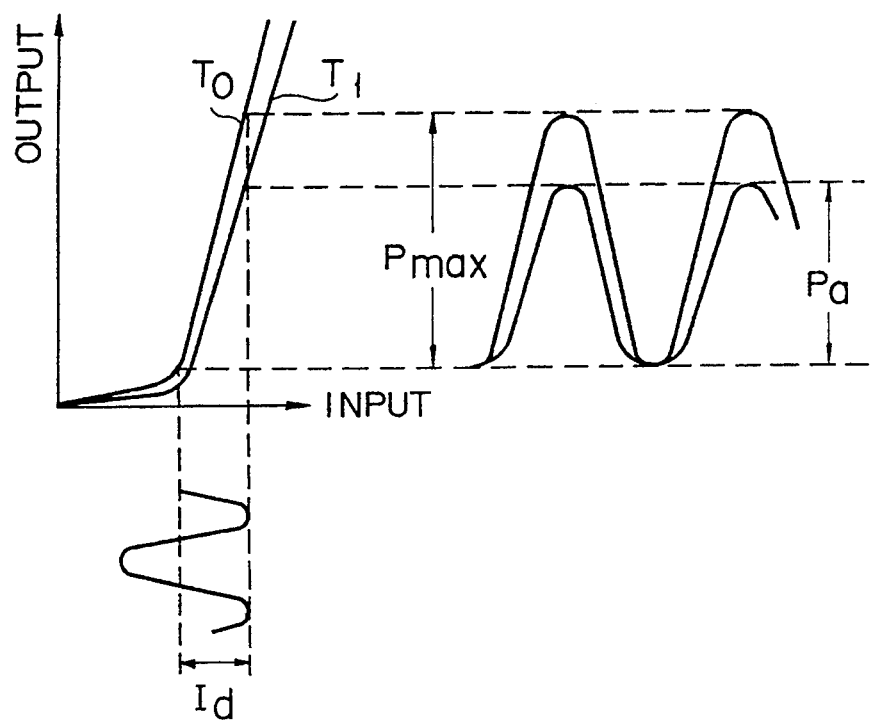
F I G. 6
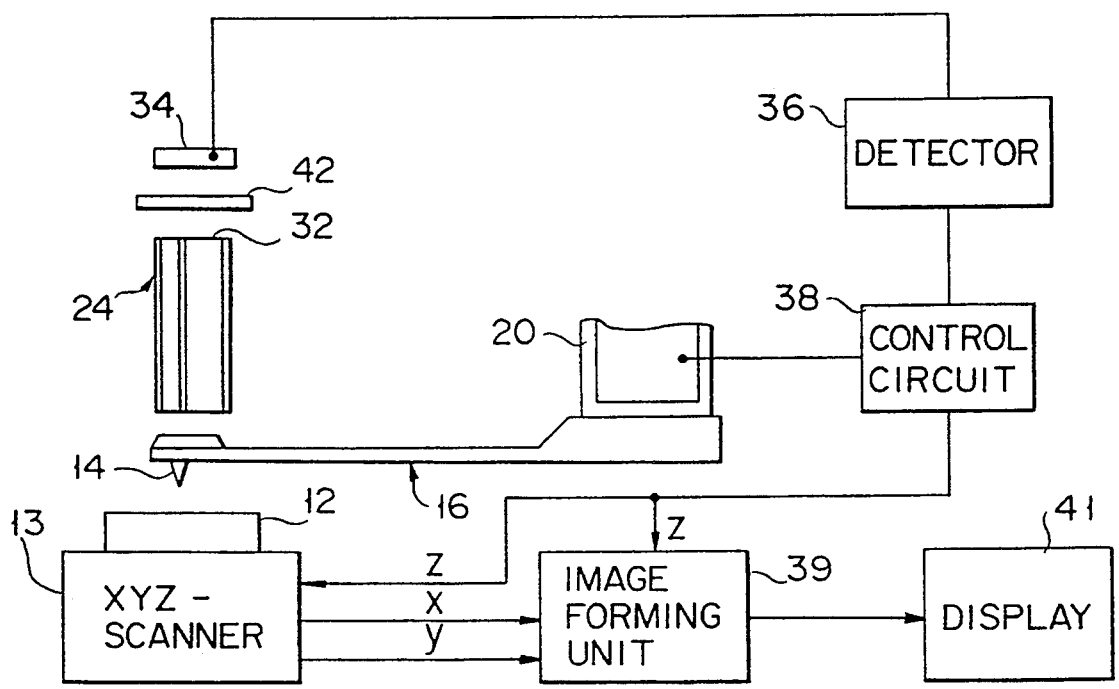
F I G. 7

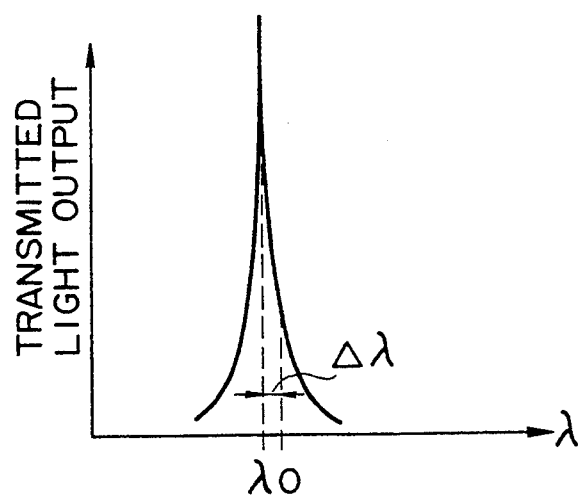
F I G. 8
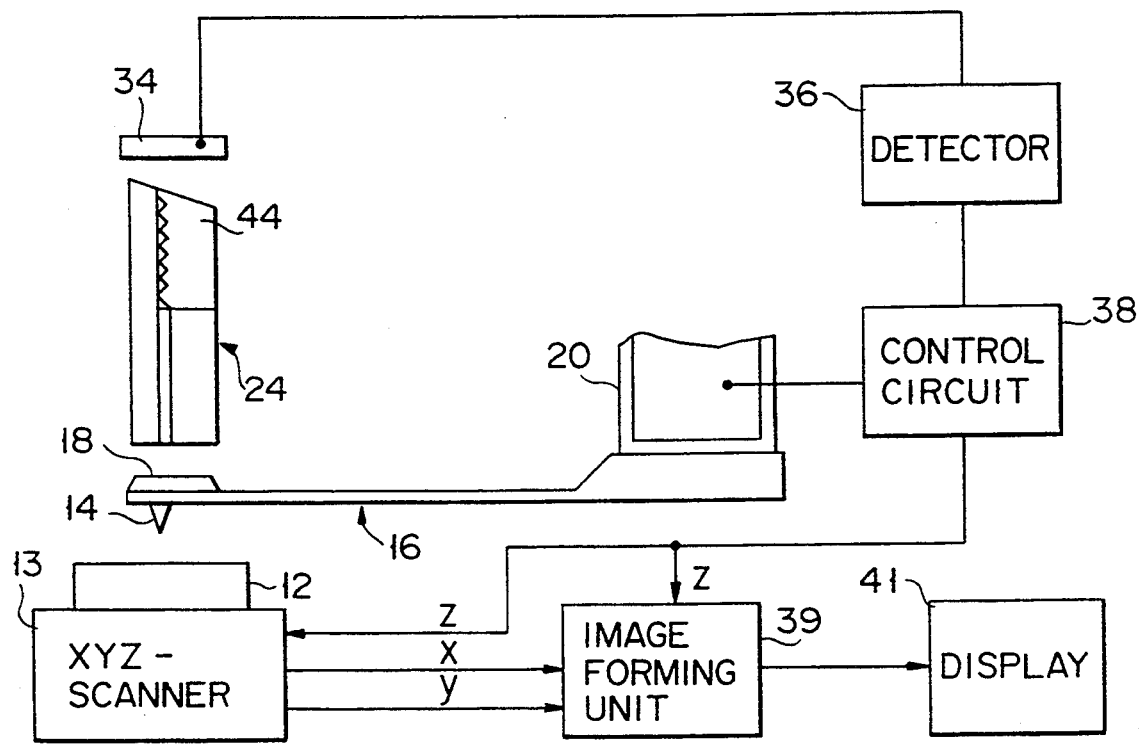
F I G. 9

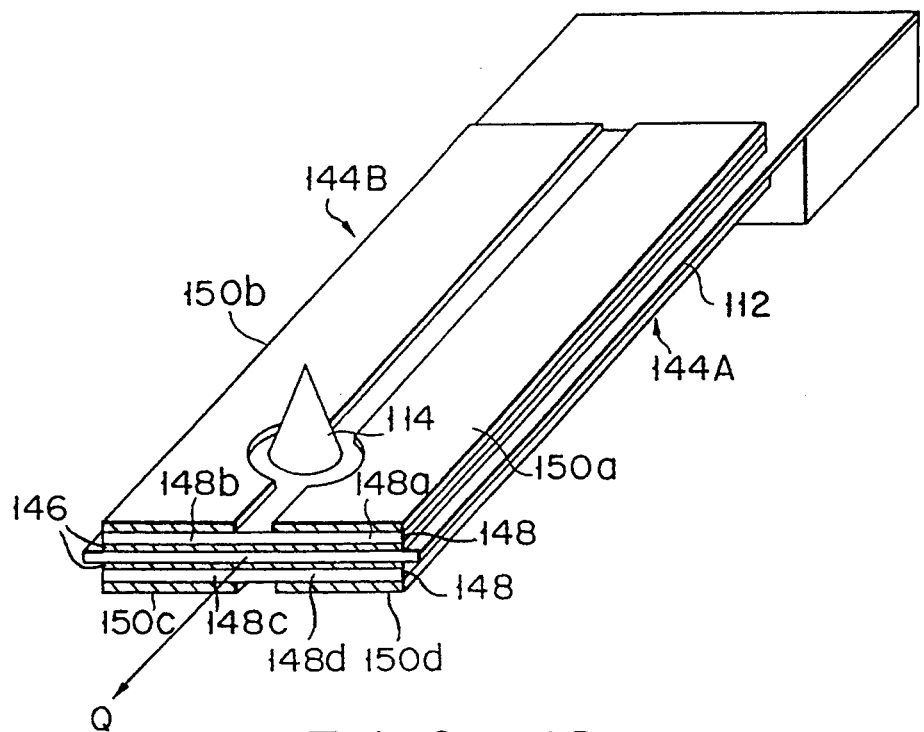
F I G. 19
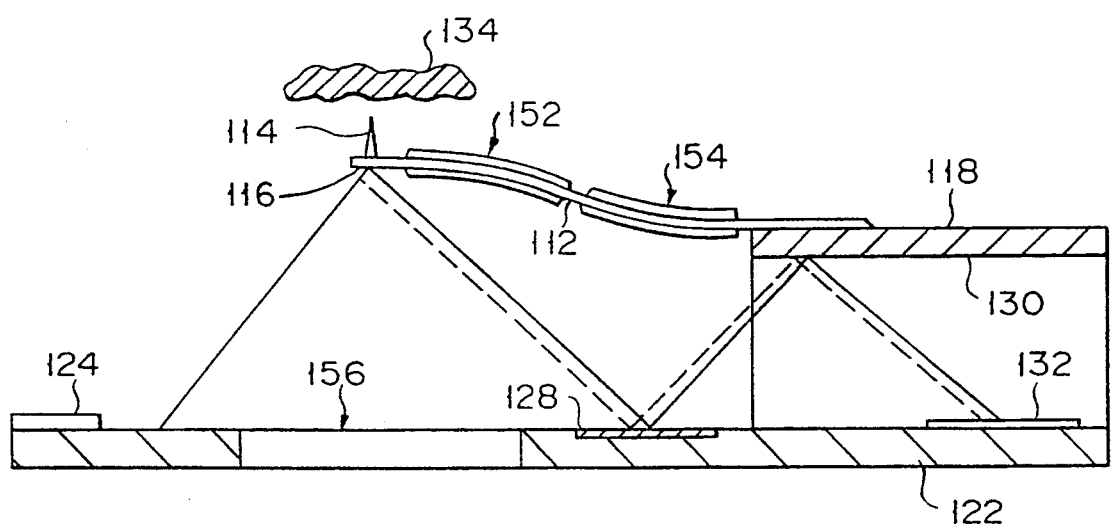
F I G. 20

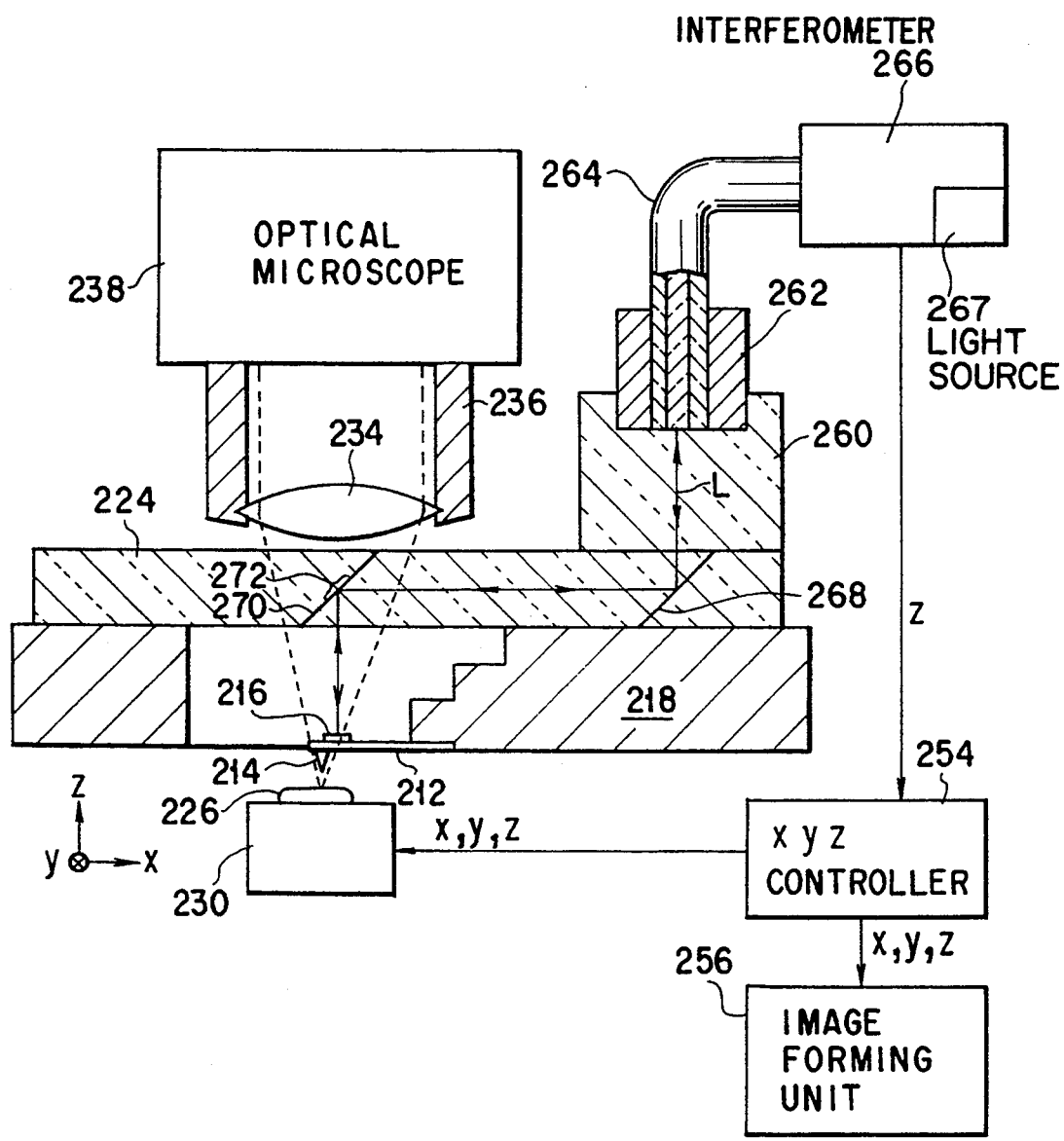
F I G. 24

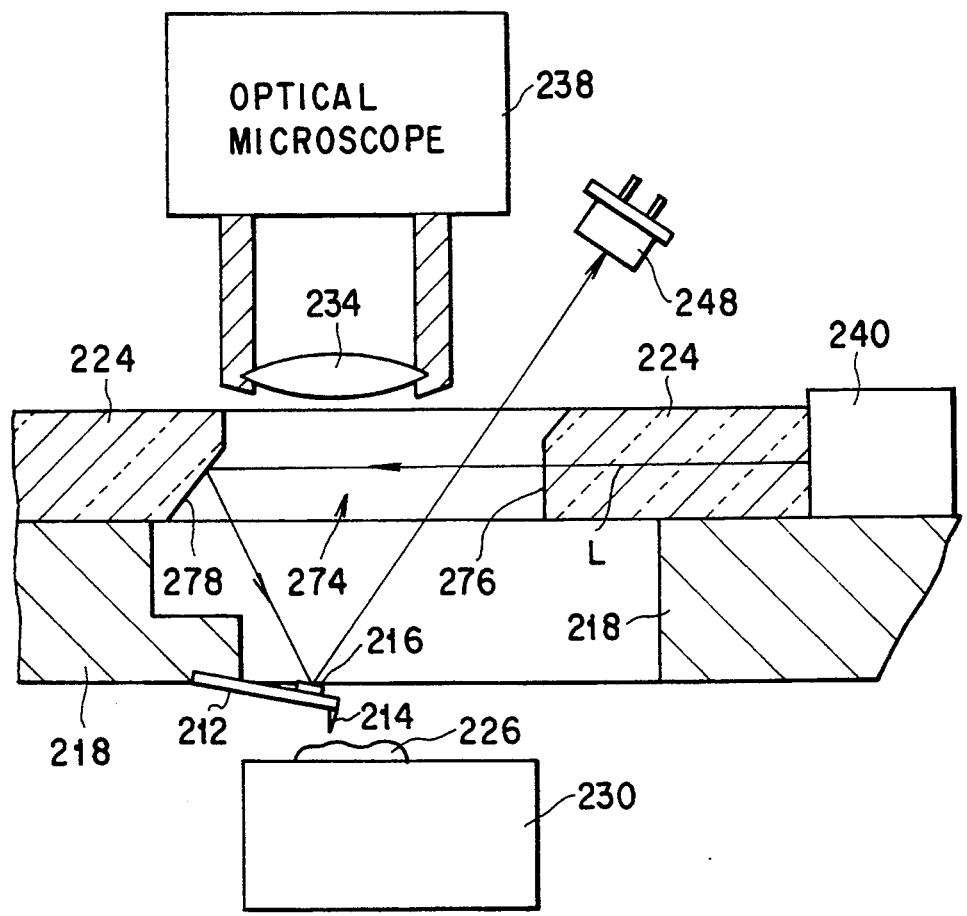
F I G. 25

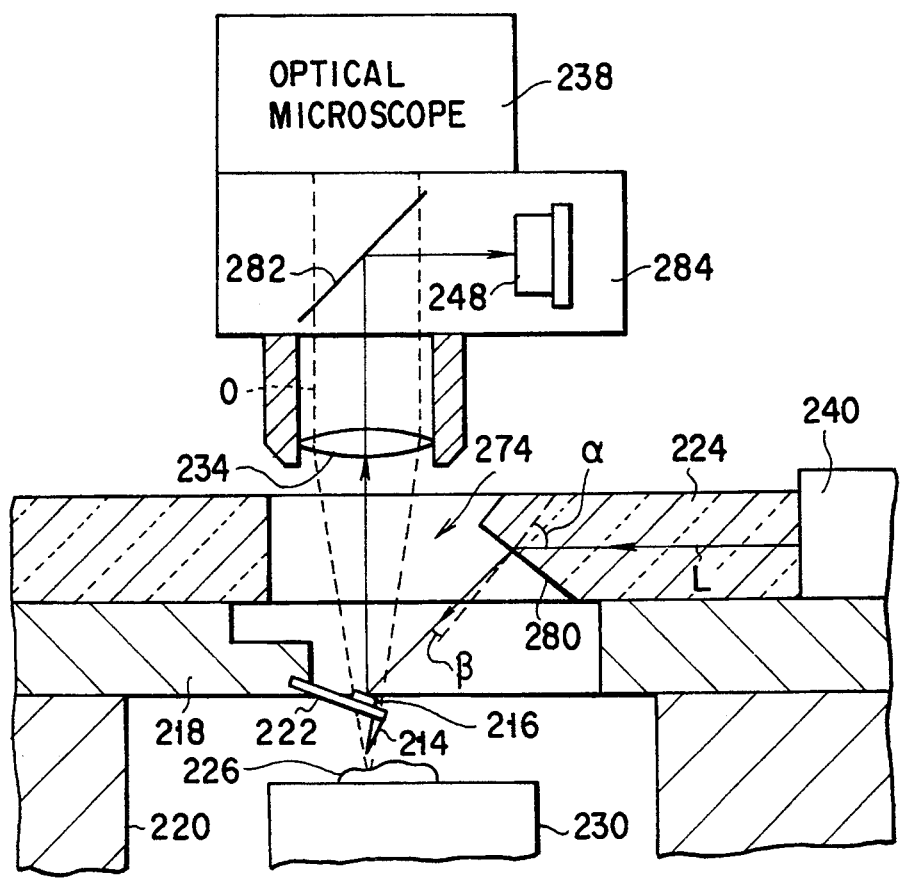
F I G. 26
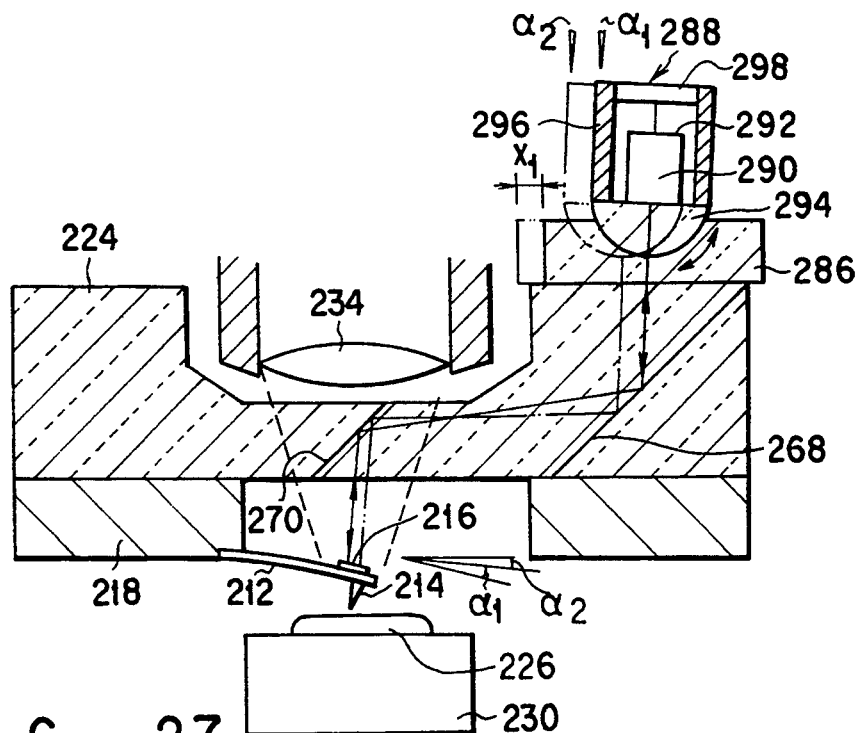
F I G. 27

ATOMIC PROBE MICROSCOPE

CROSS-REFERENCE TO THE RELATED APPLICATIONS

This application is a continuation-in-part of U.S. patent application Ser. No. 724,145, filed on Jul. 1, 1991, now U.S. Pat. No. 5,245,863, issued Sep. 21, 1993.

BACKGROUND OF THE INVENTION

1. Field of the Invention

The present invention relates to an atomic probe microscope for observing a fine surface configuration of a sample, using a pointed probe.

2. Description of the Related Art

Atomic probe microscopes include a scanning tunneling microscope (STM), an atomic force microscope (AFM) and a magnetic force microscope (MFM).

The STM was proposed in 1982 by Binnig, Rohrer, et al. It can observe a surface configuration of an electrically conductive sample on the atomic order. The STM is described in detail in "Surface Studies by Scanning Tunneling Microscope", G. Binnig, H. Rohrer, Ch. Gerber and E. Weibel, Physical Review Letters, Vol. 49, 57 (1982). The STM has an electrically conductive probe which is supported in the vicinity of the surface of an electrically conductive sample. The probe tip is approached to the sample surface at a distance of 1 nm. A voltage is applied across the probe and the sample, thereby causing a tunnel current to flow there-between. The tunnel current varies depending on the distance between the probe and the sample. If the distance varies by 0.1 μm, the current increases about ten times or decreases to about one tenth. In the observation, the probe is moved along the sample surface (e.g. "raster scan"). While the probe is being moved, the distance between the probe tip and the sample surface is controlled using a finely movable element such as a piezoelectric element, so as to keep the intensity of the tunnel current between the probe and sample at a constant value. Thus, the distance between the probe and sample is kept constant, and the locus of the probe tip creates a curved surface that is parallel to the sample surface and representative of the surface configuration of the sample. Accordingly, a three-dimensional image representing the sample surface is formed on the basis of positional data relating to the probe tip which is calculated from the voltage applied to the piezoelectric element.

On the other hand, the atomic force microscope (AFM) is proposed as an apparatus capable of observing the surface configuration of an insulative sample in the atomic order. It is described in detail in "Atomic Force Microscope", G. Binnig, C. F. Quate, Physical Review Letters, Vol. 56, 930 (1986). In the AFM, the probe is supported by a soft cantilever. When the probe is moved close to the sample surface, a van der Waals attractive force acts between an atom at the tip of the probe and an atom on the sample surface. Then, if both atoms move close to each other so as to nearly contact, a repulsive force occurs therebetween due to the Pauli exclusion principle. The attractive force and repulsive force (between atoms) are very weak and about $10^{-7}$ to $10^{-12}$ [N]. In general, when observation is effected with an atomic force microscope, the probe can approach the sample surface to such a distance that the cantilever is somewhat displaced owing to the inter-atomic force exerted on the atom at the probe tip. If the probe is scanned along the sample surface from this state, the distance between the probe and the sample varies in accordance with the configuration of the sample surface and, accordingly, the amount of displacement of the cantilever varies. The variation in displacement of the cantilever is detected. A detection signal obtained by this detection is used as a configuration signal. Alternatively, the displacement of the cantilever is subjected to feedback control on the basis of the detection signal by use of a fine movement element, such as a piezoelectric element, so as to keep the displacement of the cantilever at a constant value, and a control signal obtained by this feedback control is used as a configuration signal. As a result, the probe tip moves while describing a curved plane in parallel to the sample surface. An image of the surface configuration of the sample is constructed on the basis of the configuration signal in synchronism with the scan of the probe.

The MFM (magnetic force microscope) has a probe made of a magnetic material. The other structural features of the MFM are basically identical to those of the atomic force microscope (AFM). Like the AFM, the probe of the MFM is scanned along the sample surface while a magnetic force acting between magnetic particles of the probe and the sample is kept contact, thereby obtaining an image of the surface configuration of the sample.

The cantilever employed in the AFM or MFM should desirably be formed in an elongated shape of a material having a light weight and a high elastic coefficient, since the cantilever needs to be displaced with high responsiveness to a weak force (inter-atomic force or magnetic force). However, if the length of the cantilever increases, the characteristic frequency decreases. As a result, the responsiveness to the surface configuration of the sample at the scan time is degraded, and the removal of external vibration noise becomes difficult. Generally, the length of the cantilever is limited to 1000 μm or less and the characteristic frequency is set to about 10 to 100 kHz. Thus, the amount of displacement of the cantilever is limited, and high sensitivity to the displacement is required.

According to a method of detecting displacement of such a cantilever, an STM is constituted on the rear face (the face on which the probe is not provided) of the cantilever, and displacement of the cantilever is detected as a variation of tunnel current. In this case, if the cantilever is electrically conductive, no special treatment is required; however, if it is electrically insulative, the surface of the cantilever is coated with an electrically conductive material, for example, by means of deposition. The STM has sufficient sensitivity to the distance between the probe and the cantilever. However, since an inter-atomic force acts between the probe and the cantilever, exact measurement cannot be carried out.

According to another method, an optical reflecting surface is provided on the rear face of the end portion of the cantilever, a beam from a semiconductor laser, a ruby solid laser or an argon gas laser is made incident on the reflecting surface, and a reflection angle varying in accordance with displacement of the cantilever is detected by a PSD (position signal detector). In this method, however, if the incidence angle of the beam is increased to enhance sensitivity, the size of the apparatus increases. Consequently, the characteristic frequency decreases and the sensitivity decreases. In addition, the beam incident on the cantilever surface has a width, and, in order to enhance the resolution of the reflection angle, the flatness of the reflecting surface must be improved. This is not easy, however.

According to still another method, the light emitted from the laser is divided into a reference beam and a detection beam. The detection beam is radiated on the optical reflection surface formed on the rear of the end portion of the cantilever. A reflected beam from the reflection surface is caused to interfere with the reference beam, and an interference output is photoelectrically detected. In order to obtain good sensitivity, the light path length of the reference beam system must be equalized to that of the detection beam system, so as to cancel ambient influence (variation in temperature, atmospheric pressure, etc.). This makes the apparatus complex. If the reference beam system and the detection beam system are formed separately, it is difficult to equalize the characteristic frequencies of the respective light paths. Thus, the sensitivity is deteriorated owing to ambient influence.

According the atomic probe microscope, the probe is moved relative to the sample surface, in order to measure the sample surface configuration. During the movement, the probe is servo-controlled in the z-direction vertical to the sample surface, so as to keep the distance between the probe and the sample constant.

In the STM, the servo control of the probe is carried out by feed-back controlling the z-axial position of the probe so as to keep constant the tunnel current flowing between the probe and the conductive sample. Thus, if dust is on the sample surface or part of the sample surface is coated with an oxide film, the probe approaches the sample while removing dust or oxide film.

In either the AFM or the STM, the probe moves along the sample surface. If oxide film or dust exists above the tip of the probe, the probe suffers a shearing force by the oxide film or dust in the x- or y-direction. Consequently, there occurs an error between the actual position of the probe tip and the position found on the basis of the voltage applied to the piezoelectric element for finely moving the probe.

SUMMARY OF THE INVENTION

The object of the present invention is to provide an atomic probe microscope having a small-sized detection system capable of detecting a displacement of a cantilever due to a weak force, with high sensitivity and high stability to ambient influence.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 shows an output characteristic of a Fabry-Pérot resonator constituted between a mirror and a reflection cleavage plane shown in FIG. 1;

FIG. 7 shows schematically a second embodiment of the atomic probe microscope according to the invention;

FIG. 8 shows a wavelength selectability of an etalon shown in FIG. 7;

FIG. 9 shows schematically a third embodiment of the atomic probe microscope according to the invention;

FIG. 19 is a perspective view showing the cantilever of FIG. 17;

FIG. 20 shows a seventh embodiment of the atomic probe microscope of the present invention;

FIG. 24 shows a tenth embodiment of the atomic probe microscope of the invention;

FIG. 25 shows an eleventh embodiment of the atomic probe microscope of the invention;

FIG. 26 shows a twelfth embodiment of the atomic probe microscope of the invention; and FIG. 27 shows a thirteenth embodiment of the atomic probe microscope of the invention.

DETAILED DESCRIPTION OF THE PREFERRED EMBODIMENTS

Embodiments of the atomic probe microscope according to the present invention will now be described with reference to the accompanying drawings.

Figure 1:
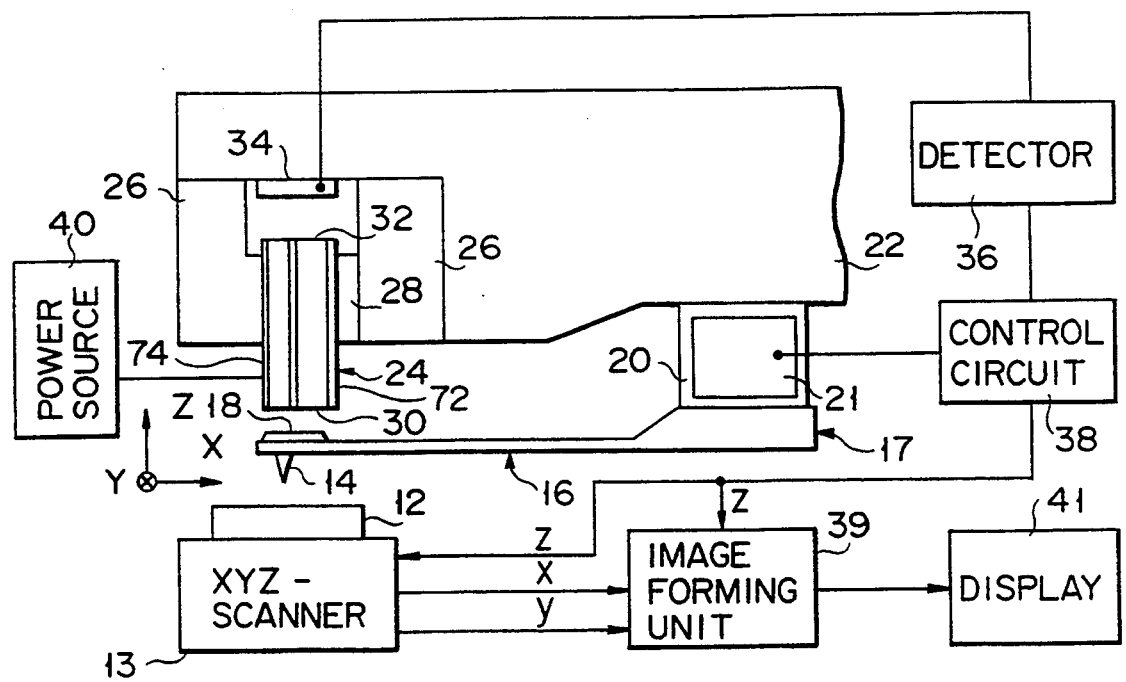
FIG. 1 shows a first embodiment of an atomic probe microscope according to the present invention.

A first embodiment will now be described with reference to FIGS. 1 to 6. As is shown in FIG. 1, the microscope of the first embodiment has a cantilever 16 having at its end a probe 14 for scanning the surface of a sample 12. The cantilever 16 has a lever portion made of $SiO_2$ (or $Si_3N_4$) with a length of 500 to 2000 $\mu$m, a thickness of 5 $\mu$m and a width of 200 $\mu$m. This type of cantilever 16 is manufactured on the basis of a semiconductor processing technique called "microfabrication" or "micromachining". For example, this technique is described in Kurt T. Peterson, "Silicon as a Mechanical Material", Proceedings of the IEEE Vol. 70, No. 5 PP. 420–457, May 1982.

The cantilever 16 has a mirror 18 on the upper surface of the end portion thereof. The mirror 18 is formed by depositing Au or Al. A support portion 17 of the cantilever 16 has a firm structure to withstand the attachment thereof to the microscope body and the exchange thereof. For example, that portion of the substrate which has not been processed by the microfabrication is used as the support portion. The support portion of the cantilever 16 is fixed to a support member 22 of silicon or Pyrex via a piezoelectric element 20 of PZT. The piezoelectric element 20 has mutually facing two electrodes 21 (only one is shown). In accordance with the voltage applied to the electrodes, the cantilever 16 is moved in the z-direction. A semiconductor laser 24 is situated above the mirror 18. The semiconductor laser 24 has mutually facing two electrodes 72 and 74. One electrode 74 is directly attached to a heat sink member 26 of, e.g. copper provided on the support member 22. The other 72 is attached to the heat sink member 26 via a silicone rubber 28. The semiconductor laser 24 has a doublehetero structure, and should desirably generate a low output with a low threshold.

Figure 2:
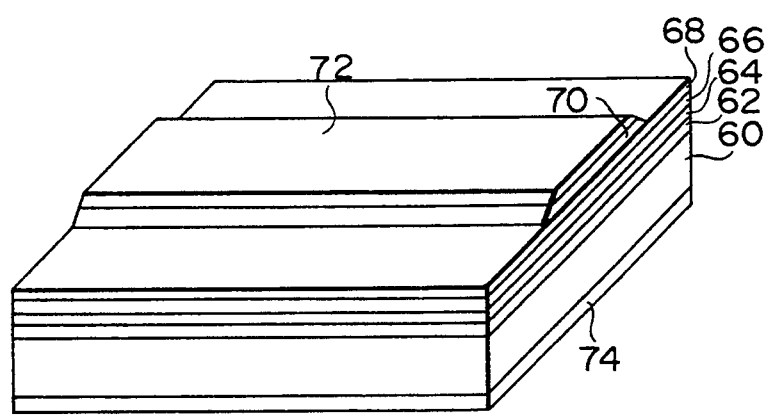
FIG. 2 is a perspective view of a semiconductor laser shown in FIG. 1.

A general semiconductor laser will now be described. FIG. 2 shows a semiconductor laser of a double-hetero structure. As shown in FIG. 2, on the (001) plane of an n-type GaAs substrate 60, the following layers are laminated successively: an n-type GaAs buffer layer 62, an n-type $Al_{0.5}Ga_{0.5}As$ clad layer 64, a p-type $Al_{0.15}Ga_{0.85}As$ active layer 66, a p-type $Al_{0.5}Ga_{0.5}As$ clad layer 68, and a strip-like n-type GaAs blocking layer 70. These layers are formed, for example, by epitaxial growth. A strip-like p-type ohmic electrode 72 is provided in contact with the blocking layer 70. An n-type ohmic electrode 74 is provided in contact with the n-type GaAs substrate.

The semiconductor laser has two parallel planes of cleavage ((110) planes) with a distance of 100 to 300 μm. A Fabry-Pérot type resonator is formed between the cleavage planes (reflecting planes). When a voltage exceeding a threshold is applied to the ohmic electrodes, light is emitted by re-coupling of injected electrons. The light travels reciprocally between the two parallel reflecting surfaces. While the light is amplified by stimulated emission, part of the light going back to the reflecting surfaces is absorbed (absorption loss). The lost light and the power due to stimulated emission are balanced, and oscillation starts. The light reciprocating in the laser resonator generates a standing wave having a face in parallel to and in phase with the reflecting surfaces. An output is obtained by partial light transmission through the reflecting surface. In a laser resonator having a resonator length greater than wavelength, a number of slightly different wavelengths can be resonated.

Figure 3:
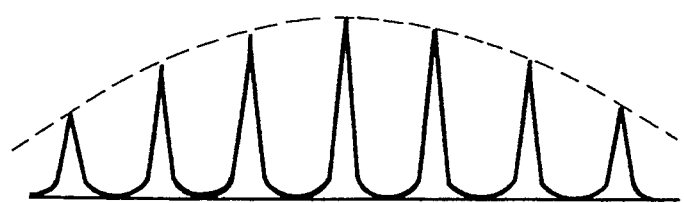
FIG. 3 shows a spectrum of a plurality of standing waves in a laser resonator.
Figure 4:
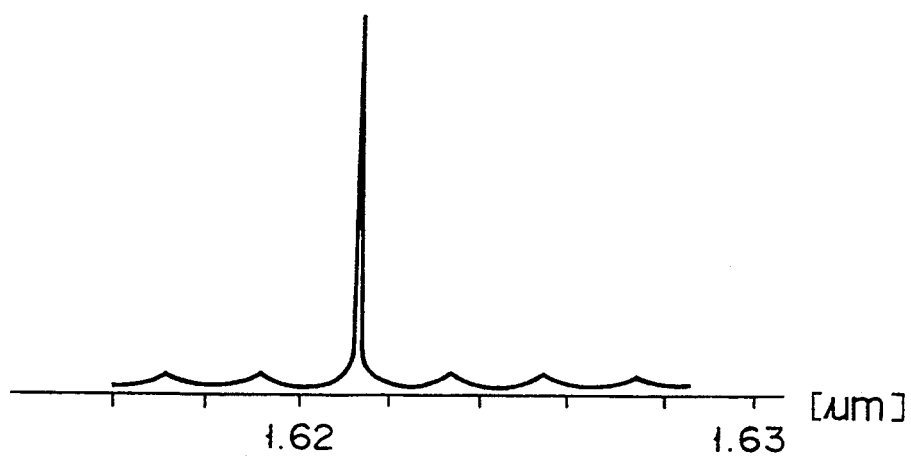
FIG. 4 shows an oscillation spectrum of a single-mode laser.
Figure 5:
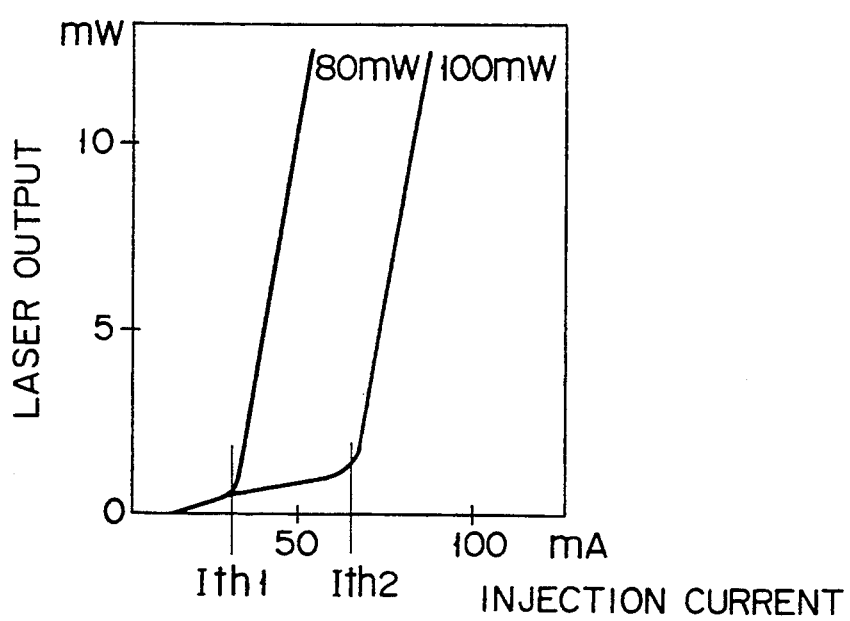
FIG. 5 shows an injection current/output characteristic of a semiconductor laser.

FIG. 3 shows a spectrum of standing waves in the laser resonator. The length L of the laser resonator is given by $L=q\lambda/2n_{eq}$ (q=an integer), where λ=wavelength of light, and $n_{eq}$=an equivalent refractive index of a waveguide. When λ=0.85 μm, $n_{eq}$=3.5 and L=300 μm, the standing wave has a node of q=2470−1. Suppose that a current not lower than a threshold ($I_{th1}$, $I_{th2}$) of an injection current/output characteristic in FIG. 5 is applied to a double-hetero structure semiconductor laser with a narrow active layer and reduced horizontal/lateral mode oscillation. In this case, as shown in FIG. 4, the laser functions as a single-mode laser oscillating only at a center spectrum. The width of this spectrum is very small and, e.g. about ⅓ to 1/6 of the vertical mode distance Δμ (0.3 to 2 nm). The output is abruptly decreases by a wavelength shift of about 0.2 to 0.8 Å.

A typical laser used for optical communication is a distribution feedback type (DFB) laser in which a grating is provided in an active region or a distribution reflection type (DBR) laser in which a grating is provided on either side or both sides of an active region. These lasers are employed in consideration of light distribution in fibers, and they can perform a stable single-mode oscillation. In this type of laser, the oscillation wavelength is determined by the cycle of the grating; therefore, a single-mode oscillation can stably be carried out. In a semiconductor laser for communication, a high electric current is injected to obtain a high output. Consequently, a large quantity of energy is converted to heat, and not to light, resulting in an increase in temperature of the laser. In the Fabry-Pérot mode, the refractive index of the active region varies owing to the temperature increase, and the wavelength varies at a rate of 0.6 to 0.8 Å/deg. in a GaAs/AlGaAs laser and at a rate of 1.0 Å/deg. in a GaInAsP/InP laser. Thus, the laser is unstable when the output power is increased.

In the semiconductor laser 24 according to the present embodiment, the cleavage plane (transmissive cleavage plane) 30, which is closer to the mirror 18, is coated with an anti-reflection (AR) film of $SiO_2$ or $Si_3N_4$, and the cleavage plane (reflection cleavage plane) 32, which is distant from the mirror 18, is coated with an $Al_2O_3$ film. These cleavage planes 30 and 32 and mirror 18 are arranged parallel, and a Fabry-Pérot resonator is constituted by the mirror 18, reflection cleavage plane 32 and the waveguide. When an electric current exceeding a threshold is injected in the resonator, a laser beam having a predetermined frequency is output from the reflection cleavage plane 32. A photodetector 34 for detecting a laser beam emitted from the laser 24 is situated above the reflection cleavage plane 32. The photodetector 34 is, for example, a high-sensitivity PIN photodiode made of a material having a sensitivity corresponding to the wavelength of the laser beam.

When no force is exerted on the probe 14, the mirror 18 is situated parallel to the reflection cleavage plane 32, and the resonator exhibits an output characteristic $T_0$ in FIG. 6. When an electric current having an amplitude $I_d$ and a frequency $f_d$ is supplied from a power source 40 to the laser 24, a laser beam having a maximum amplitude $P_{max}$ is detected by the photodetector 34. When the probe 14 approaches the sample 12 and an interatomic force acts therebetween. In this case, the tip portion of the cantilever 16 moves towards the semiconductor laser 24, and the mirror 18 and reflection cleavage plane 32 become non-parallel. Thus, the quantity of light confined in the resonator decreases. As a result, the effective output characteristic varies as shown by curve $T_1$ in FIG. 6, and the maximum amplitude of the laser beam detected by the photodetector 34 decreases from $P_{max}$ to $P_a$. Accordingly, the photodetector 34 generates a signal corresponding to the interatomic force acting between the probe 14 and the sample 12, i.e. the displacement (warp) of the cantilever 16. The variation in amplitude (output) of the laser beam can be detected by monitoring excitation current by means of a current monitor element provided within the semiconductor laser. The monitor element employed here is one of two semiconductor lasers connected in series, or diode detectors juxtaposed on a semiconductor substrate.

Prior to measurement, the inter-atomic force acting between the probe 14 and the sample 12 is set to be an attractive force $F_{attractive} = F_{a0}$ or a repulsive force $F_{repulsive} = F_{r0}$, depending on the type of the sample. The cantilever 16 is displaced by the set inter-atomic force. The voltage applied to the piezoelectric element 20 is controlled by a control circuit 38 so as to obtain a predetermined output amplitude $P_a$, whereby the distance between the mirror 18 and the reflection cleavage plane 32 is adjusted.

In the measurement, the probe 14 is approached to the sample 12 by a Z-drive device (not shown). The Z-drive device is stopped at the position where the above predetermined output amplitude $P_a$ is obtained. In this state, the probe 14 and the sample 12 are relatively moved by conventional XYZ-scanner 13 (e.g. a cylindrical scanner), whereby the probe 14 scans the surface (XY-surface) of the sample. Then, the distance between the probe 14 and sample 12 varies in accordance with the sample surface configuration, and the output from the photodetector 34 varies. The output from the photodetector 34 is input to a detector 36 so that the variation in the output from the photodetector 34 is detected. A predetermined servo voltage is supplied from the control circuit 38 to xYZ-scanner 13 so as to cancel the variation in the output from the photodetector 34. During the scanning, the voltage applied to XYZ-scanner 13 is generated by the control circuit 38. The output signal (z-signal) from the control circuit 38, which represents the height data of the sample surface is supplied to an image forming unit. The image forming unit 39 processes the height data (z-signal) relating to the sample surface and positional signals (x-signal and y-signal) representing the position of the sample surface output from the XYZ-scanner 13. The image forming unit 39 thus generates a three-dimensional image of the sample surface configuration. The image is displayed on a display 41.

FIG. 7 shows a schematic a second embodiment of the invention. The structure of the second embodiment is substantially identical to that of the first embodiment, except that an etalon 42 adjusted to selectively transmit a laser wavelength $\lambda_0$ is disposed between the reflection cleavage plane 32 and the detector 34.

The etalon 42 is known as a wavelength selecting filter. The etalon 42 comprises two mirrors with an equal reflectance, which are precisely arranged in parallel. As the reflectance becomes closer to 100%, the spectrum bandwidth of the transmitted light becomes narrower. The wavelength of transmitted light is controlled by the incidence angle of the etalon. The etalon 42 may be constructed by laminating vapor-deposition thin films.

The apparatus of this embodiment is suitable in the case where the inter-atomic force acting between the probe 14 and the sample 12 is an attractive force weaker than a repulsive force. In other words, if the inter-atomic force between the probe 14 and sample 12 is the attractive force, the variation in the distance between the probe and sample is small relative to the variation in the inter-atomic force; thus, the displacement of the cantilever 16 is small, compared to the case of repulsive force. Accordingly, the parallelism of the mirror 18 and reflection cleavage plane 32 is not greatly lost, and the variation of the laser output characteristic is small. However, the etalon 42 has a steep wavelength selection characteristic, as shown in FIG. 8. Thus, when the mirror 18 and reflection cleavage plane 32 are in parallel, the light of wavelength $\lambda_0$ passes through with no substantial attenuation. However, if the wavelength is displaced from $\lambda_0$, the intensity of transmitted light is suddenly decreased. Thus, in the case where the parallelism of the mirror 18 and reflection cleavage plane 32 is not greatly lost, the displacement of the cantilever 16 can be detected by the photodetector 34 with adequate precision. Like in the first embodiment, the output from the photodetector 34 is supplied to the control circuit 38 via the detector 36. Thus, the distance between the probe tip and the sample surface is controlled, and an image of the sample surface configuration is formed by the image forming unit 39 on the basis of the output signal (z-signal) from the control circuit 38 and the output signal (x-signal and y-signal) from the XYZ-scanner 13. The formed image is fed to the display 41.

A third embodiment of the invention will now be described. As shown in FIG. 9, in the third embodiment, the reflection cleavage plane 32 of the semiconductor laser 24 in FIG. 1 is replaced by a Bragg grating 44.

In a semiconductor laser, a Fabry-Pérot reflection mirror comprising two cleavage planes is a wavelength selecting filter. If a cyclic structure (Bragg grating 44) of a pitch (P) less than the distance (L) between both cleavage planes is provided along the light path, the refractive index of the waveguide is modulated periodically and equivalently. Only that portion of the transmitted light, which has a wavelength tuned to the pitch (P) of the Bragg wavelength, is reflected in a direction reverse to the light advancing direction, on the same principle that electron waves are scattered in a crystal. Thus, there can be obtained a reflection element or transmission filter having a spectrum width less than in the case of Fabry-Pérot interference. The reflectance (transmissivity) of the reflection element is determined by the cut angle.

Like the etalon 42 of the second embodiment, the Bragg grating 44 has a steep wavelength selection characteristic and constitutes a reflection mirror having a predetermined reflectance. Thus, an atomic force microscope suitable for the case where an attractive force acts between the probe 14 and the sample 12 is constituted. The operation of this microscope has been described in connection with the second embodiment, and a description thereof may be omitted here.

Figure 10:
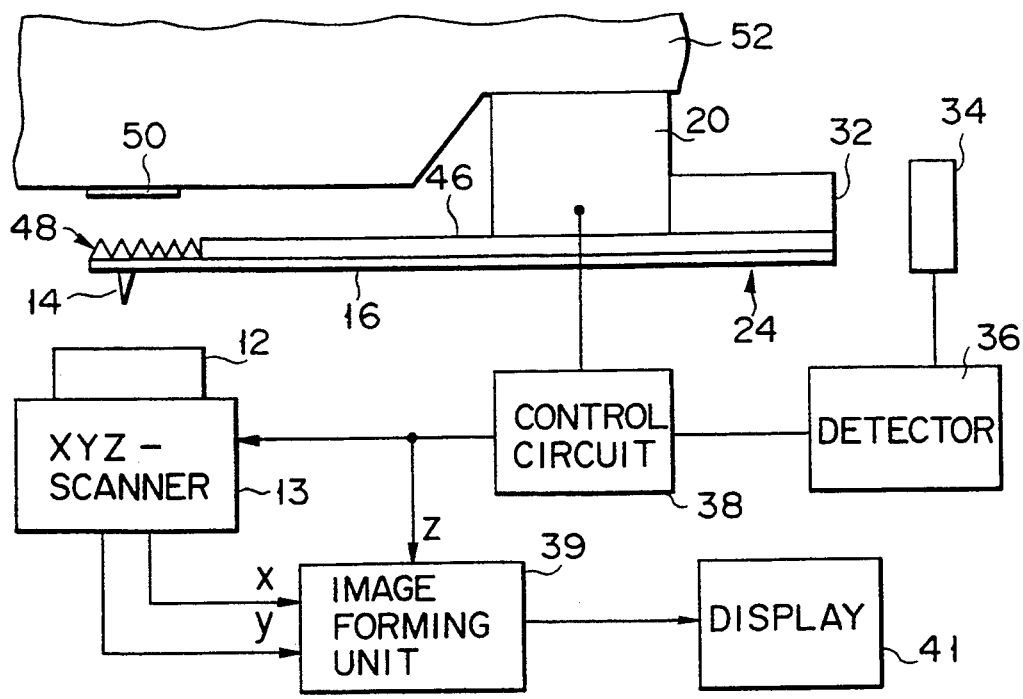
FIG. 10 shows a fourth embodiment of the atomic probe microscope according to the invention.

FIG. 10 shows the structure of a fourth embodiment of the invention. In the fourth embodiment, the semiconductor laser 24 is provided at the end portion of the cantilever 16. The cantilever 16 comprises a waveguide 46 for guiding light from the laser 24 to the tip portion and a conventional grating reflection element 48 for vertically reflecting light from the waveguide 46. A mirror 50 is situated parallel to the grating reflection element 48. The mirror 50 is provided on a support 52 for supporting the piezoelectric element 20.

Light from the semiconductor laser 24 travels through the waveguide 46 and reaches the grating reflection element 48. The light is reflected by the reflection element 48 and directed to the mirror 50. The distance between the element 48 and 50 is about several $\mu$m. The mirror 50 reflects the light once again. The light from the mirror 50 travels through the grating reflection element 48 and waveguide 46 to the reflection cleavage plane 32. As a result, a Fabry-Pérot resonator is constituted between the reflection cleavage plane 32 and the mirror 50. The photodetector 34 detects the displacement of the probe 14 as a variation in intensity of light emitted from the reflection cleavage plane 32. As in the first embodiment, the output from the photodetector 34 is input to the control circuit 38 via the detector 36. Thus, the distance between the probe tip and the sample surface is controlled, and, on the basis of the output signal (z-signal) from the control circuit 38 and the output signal (x-signal and y-signal) from the XYZ-scanner 13, the image forming unit 39 generates an image of the sample surface. The image is fed to the display 41.

Figure 11:
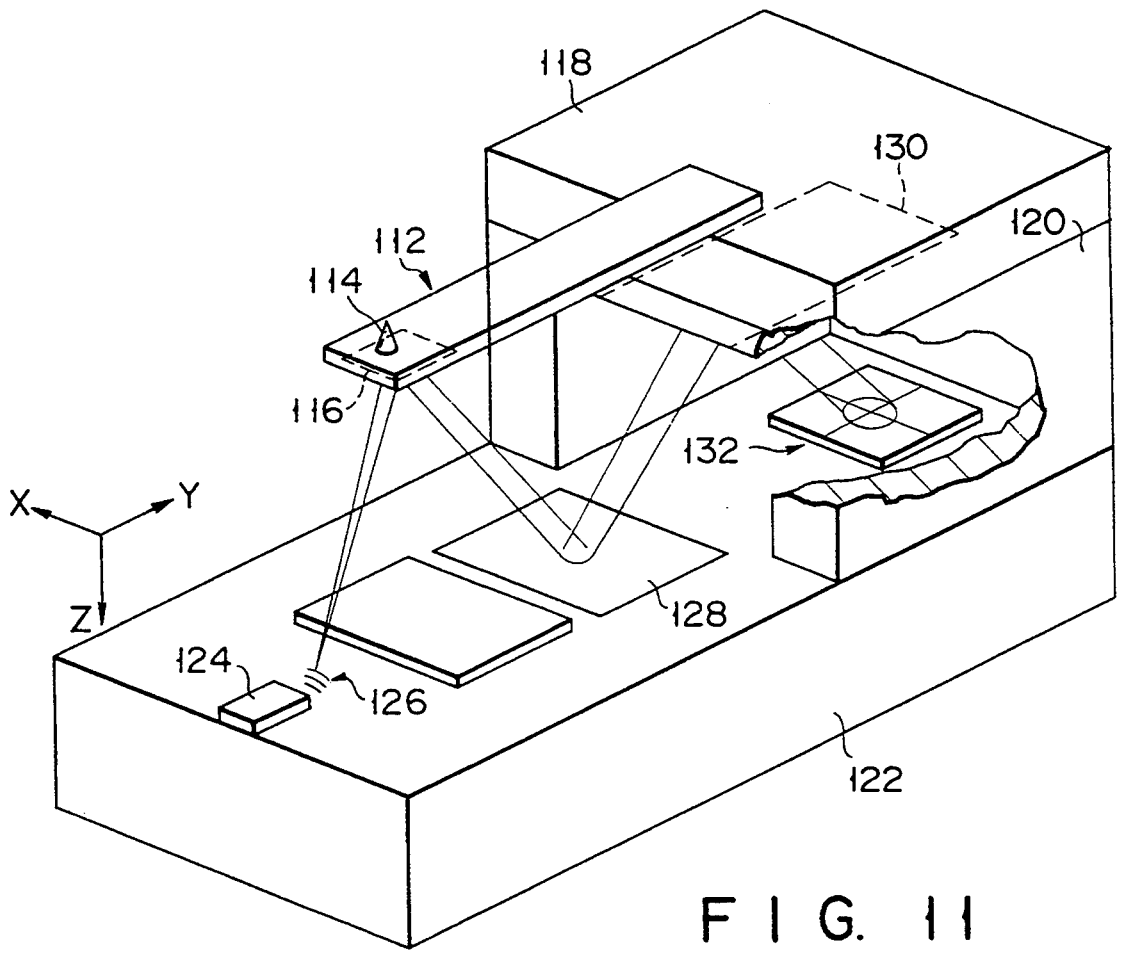
FIG. 11 shows a fifth embodiment of the atomic probe microscope according to the invention.

Next, a fifth embodiment of the atomic probe microscope of this invention will be described. As is shown in FIG. 11, a cantilever 112 comprises a probe 114 and a mirror 116, respectively, on the upper and lower surfaces of the tip end portion thereof. The other end portion of the cantilever 112 is fixed to an upper silicon substrate 118. The upper silicon substrate 118 is fixed to a lower silicon substrate 122 via an intermediate block 120 having a U-cross section. The lower silicon substrate 122 comprises a semiconductor laser 124 and a waveguide 126. The laser 124 is fabricated by means of a semiconductor process. The waveguide 126 has a Bragg reflector or a prism at one end and is designed for emitting a laser beam from the laser 124 at a predetermined angle. The waveguide 126 is formed, for example, by repeating deposition/etching processes on the silicon substrate 122. The laser beam emitted from the waveguide 126 is reflected by the reflection mirror 116 on the cantilever 112. The beam reflected by the mirror 116 is further reflected by a first reflection surface 128 on the lower silicon substrate 122 and then by a second reflection surface 130 provided on the intermediate block 120. Finally, the beam is made incident on a photodetector 132 provided on the lower silicon substrate 122.

Figure 12:
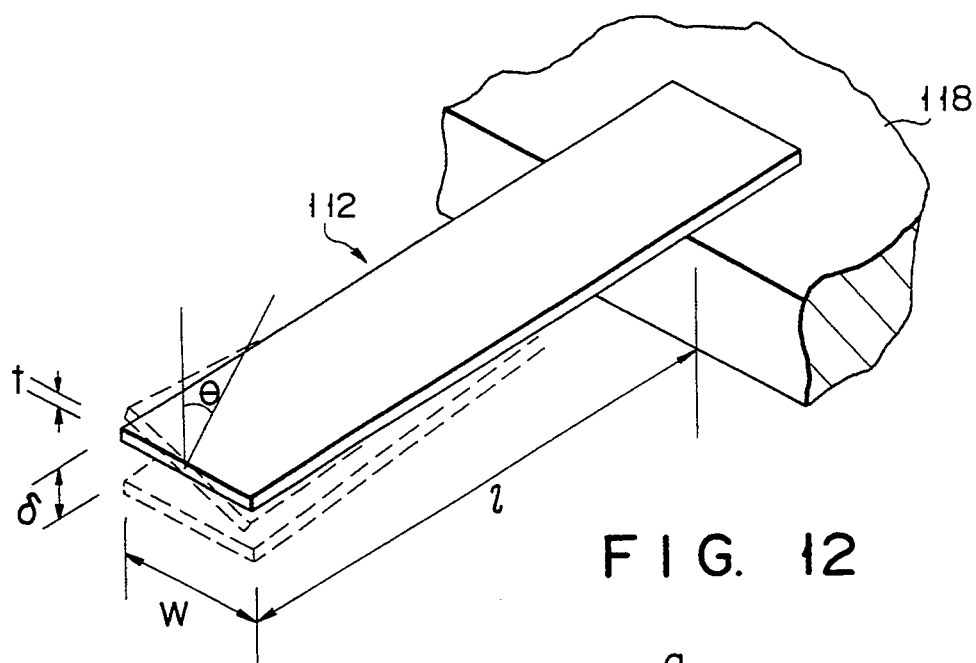
FIG. 12 is a view for illustrating the size of the cantilever in FIG. 11.

When the cantilever 112 is displaced by force F by a degree of δ, as shown in FIG. 12, the displacement is given by $$\delta = 4l^3 F / tw^3 E \quad (1)$$

where l = the length of the cantilever 112, t = the thickness of the cantilever, w = the width of the cantilever, and E = the vertical elastic coefficient of the cantilever.

Figure 13:
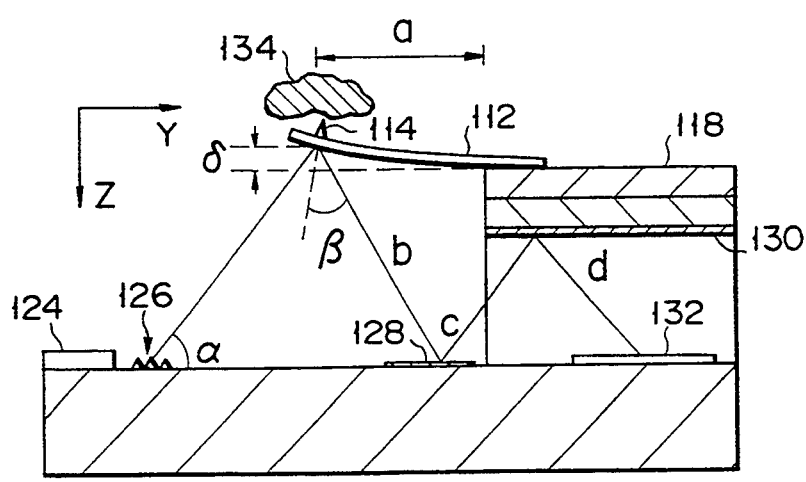
FIG. 13 is a view for illustrating the displacement of the cantilever in FIG. 11 due to an inter-atomic force.
Figure 14:
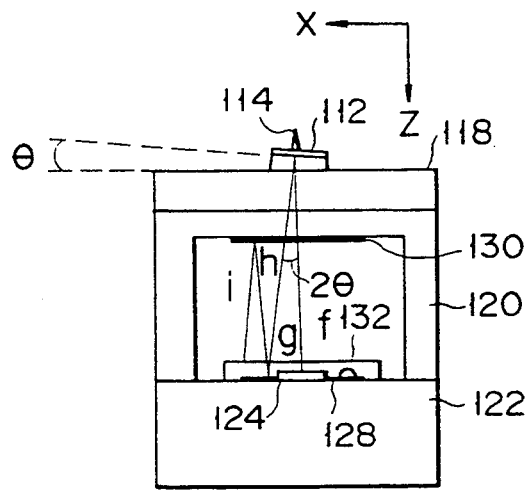
FIG. 14 is a view for illustrating the rotational displacement of the cantilever in FIG. 11 due to a shearing force.

When the cantilever 112 is displaced by δ, the position of the main laser beam illuminated on the photodetector 132 moves by Δy accordingly. In FIG. 13, a denotes a distance between the proximal end of the cantilever 112 and the position of the probe 114, b denotes the length of a light path (in a y-z plane) between the reflection mirror 116 and the first reflection surface 128, c denotes the length of a light path between the first reflection surface 128 and the second reflection surface 130, and d denotes the length of a light path between the second reflection surface 130 and the photo-detector 132. The amount of movement Δy and the distance and lengths a, b, c and d have the following relationship:

$$\Delta y \propto \delta(a+b+c+d)/a$$

when the cantilever 112 is rotated by θ by moment load T, the angle θ is given by $$\theta = 3lt/tw^3 G \quad (2)$$

where G = the lateral elastic coefficient of the cantilever 112. When the cantilever 112 rotates by θ, the position of the main beam incident on the photodetector 132 shifts by Δx accordingly. Referring to FIG. 14, the amount of movement Δx is given by $$\Delta x = \sin 2\theta (g+h+i) \quad (3)$$

where g = the length of a light path (in an x-z plane) between the reflection mirror 116 and the first reflection surface 128, h = the length of a light path between the first reflection surface 128 and the second reflection surface 130, and i = the length of a light path between the second reflection surface 130 and the photodetector 132.

The amounts of movement ax and Δy are detected by the photodetector 132.

Figure 15:
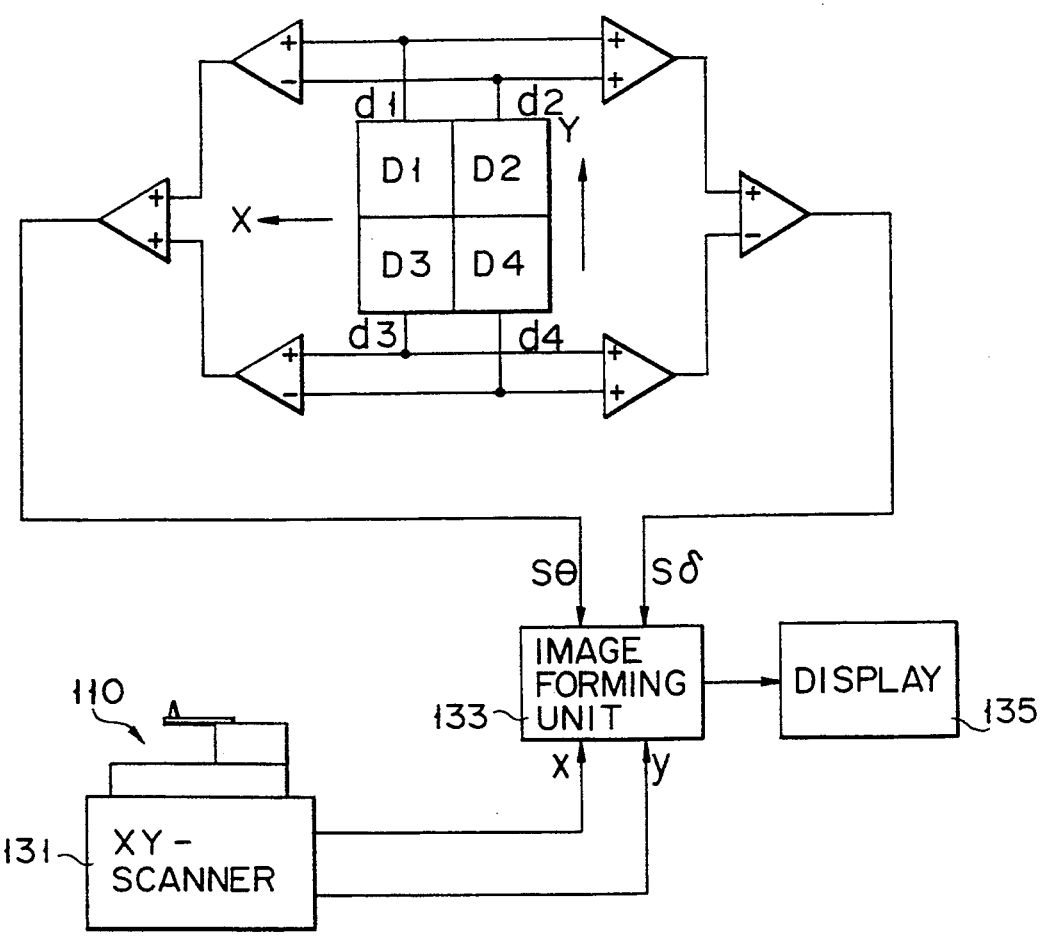
FIG. 15 is a block diagram for illustrating the information processing in the fifth embodiment.

The photodetector 132 comprises four light-receiving portions $D_1$, $D_2$, $D_3$ and $D_4$ which generate signals $d_1$, $d_2$, $d_3$ and $d_4$. As is shown in FIG. 15, conventional adders and subtracters are combined to produce signals Sδ and Sθ which are represented by $$S\delta = (d_1+d_2)-(d_3+d_4) \quad (3)$$

$$S\theta = (d_1-d_2)+(d_3-d_4) \quad (4)$$

The signals Sδ and Sθ are proportional to Δy and Δx. Accordingly, the displacement δ and rotational angle θ of the cantilever 112 are found on the basis of signals Sδ and Sθ. The signals Sδ and Sθ, along with positional signals (x-signal and y-signal) of the probe output from the XY-scanner 131, are supplied to an image forming unit 133 and analyzed to produce an image of the sample surface configuration. The image produced by the image forming unit 133 is displayed on a display 135.

Figure 16:
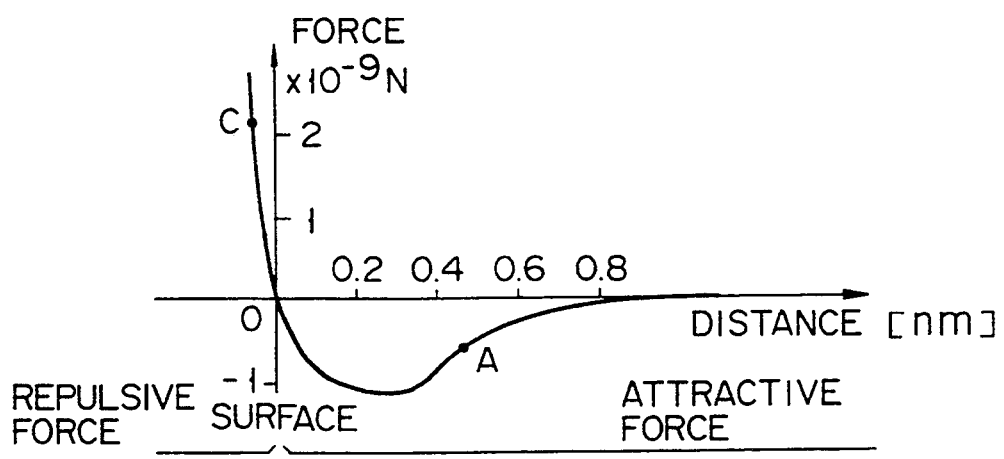
FIG. 16 is a graph showing the relationship between the probe/sample distance and the inter-atomic force acting between the probe and sample.

The photodetector 132 is situated in such a position that Sδ=0 is output when the cantilever 112 is displaced, for example, by $\delta_0$. In other words, in the design process, the relationship between the inter-atomic force and the probe/sample distance, which is illustrated in FIG. 16, is referred to. For example, the displacement $\delta_0$ of the employed cantilever 112 in relation to the force acting at a distance A is found in advance by using equation (1). Thus, the photodetector 132 is situated in such a position that Sδ=0 is output when the cantilever 112 is displaced by $\delta_0$.

The measuring operation of the above apparatus will now be described. When measurement is carried out, the entire apparatus is moved in the Z-direction by means of a rough movement mechanism (not shown) attached to the lower silicon substrate 122. Thereby, the probe 114 attached to the cantilever 112 is approached to the sample 134. While the probe 114 is approached to the sample 134, a laser beam is emitted from the semiconductor laser 124. When the output Sδ has become 0, the approaching of the probe 114 is stopped. As a result, the cantilever 112 is stopped in the state in which it is displaced by $\delta_0$.

Subsequently, the entire apparatus 110 is moved in XY-directions by the XY-scanner 131 so as to enable the probe 114 to scan the surface of the sample 134. When the probe 114 is moved, the distance between the probe 114 and the sample 134 varies in accordance with the surface configuration of the sample 134, and the interatomic force acting on the probe 114 varies accordingly. Consequently, the displacement of the cantilever 112 varies from $\delta_0$. As has been described above, the displacement of the cantilever 112 varies the reflection angle $\beta$ of the laser beam from laser 124 at the reflection mirror 116. The displacement of the cantilever 112 is detected as an output signal $S\delta$ from the photodetector 132 which is given by equations (1) and (3). When a shearing force acts on the probe 114, the cantilever 112 is displaced in the rotational direction. The rotational angle $\theta$ of the cantilever 112 is detected as an output signal $S\theta$ from the photodetector which is given by equations (2) and (4). The signals $S\delta$ and $S\theta$, as well as output signals (x-signal and y-signal) from the XY-scanner 131 which represent the position of the surface of the sample 134, are supplied to the image forming unit 133; thus, an image representing the surface configuration of the sample 134 is formed. The formed image is displayed on the display 135.

In this embodiment, the probe 114 is designed to operate within a region of attractive force. Thus, the cantilever 112 is normally displaced if the unevenness of the sample surface is within a range of ± about 0.2 μm from position A. If the probe 114 is distant from the sample 134 by 0.8 nm or more, the cantilever 112 stops in a parallel position and does not displace. If the probe 114 is close to the sample at a distance of 0.5 μm or less, the probe/sample distance does not exactly correspond to the inter-atomic force.

Figure 17:
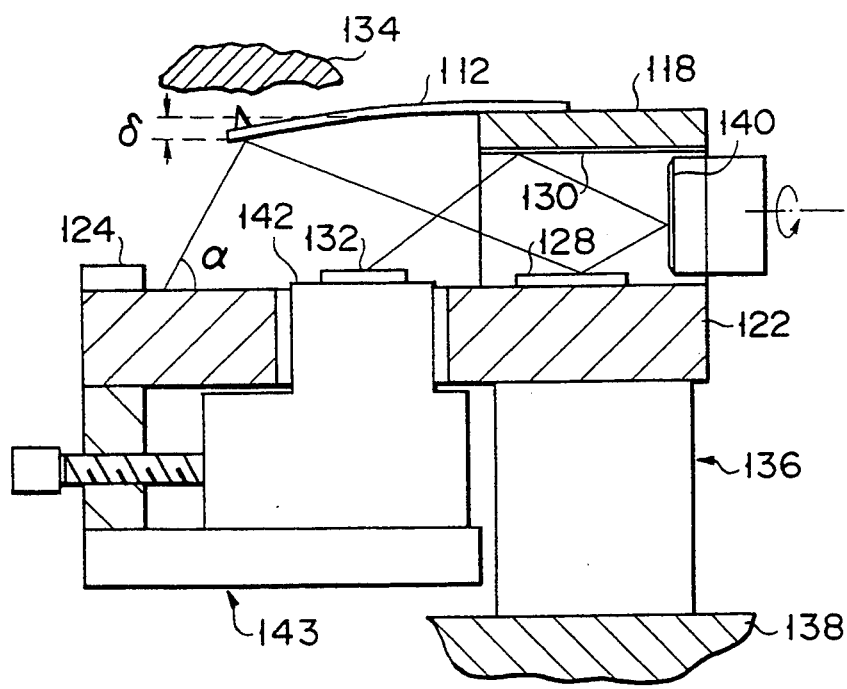
FIG. 17 shows a sixth embodiment of the atomic probe microscope according to the invention.
Figure 18:
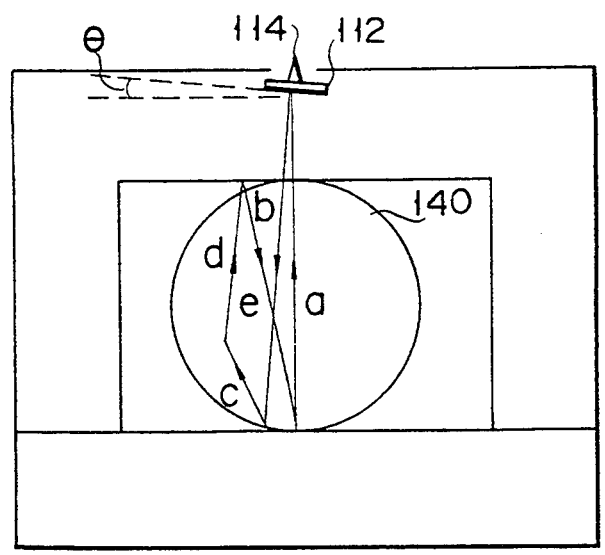
FIG. 18 is a view for illustrating the light path at the time the cantilever in FIG. 17 has rotated by an angle $\theta$.

Referring now to FIGS. 17 to 19, a sixth embodiment of the atomic probe microscope of the present invention will be described.

In the sixth embodiment, the lower silicon substrate 122 is fixed to a rough movement device 138 with a piezoelectric actuator 136 interposed. The actuator 136 is a conventional z-directional fine movement device used in an STM, etc. A rotational mirror 140 is provided on a light path of a laser beam emitted from the semiconductor laser 124. The mirror 140 is rotatable about the y-axis and has a mirror surface slightly inclined with respect to a plane vertical to the y-axis. A fine movement device including a y-directionally movable stage 142 is attached to the lower silicon substrate 122. A photodetector 132 is fixed on the stage 142 which is substantially on a level with the upper surface of the lower silicon substrate 122.

The cantilever 112 used in this embodiment has two pairs of bimorphs 144A and 144B extending in the longitudinal direction, as shown in FIG. 19. This type of bimorph 144A, 144B was proposed by C. F. Quate et al. of the Stanford University, and was built in an STM cantilever. The structure and operation of the bimorphs will now be described with reference to FIG. 19. The bimorphs 144A and 144B are formed in the following manner. Al electrodes 146 for grounding are provided on the upper and lower surfaces of the cantilever 112. Piezoelectric layers 148 of ZnO, etc. are formed by deposition on the upper and lower surfaces of the Al electrode 146. Al electrodes 150a, 150b, 150c and 150d for driving, which are divided at the center, are deposited on the upper and lower surfaces of the piezoelectric layers 148. In this structure, one bimorph 144A is constituted between the electrodes 150a and 150d, and the other bimorph 144B is constituted between the electrodes 150b and 150c.

The piezoelectric layers 148 covered by the electrodes 150a, 150b, 150c and 150d are denoted, respectively, by numerals 148a, 148b, 148c and 148d. The layers 148a, 148b 148c and 148d have lengths la, lb, lc and ld. When voltages $V_1$, $V_2$, $V_1$ and $V_2$ ($V_1 > V_2$) are applied to the electrodes 150a, 150b, 150c and 150d, the lengths of the piezoelectric layers become la=lc>lb=ld. As a result, the bimorph 144A warps downwards, the bimorph 144B warps upwards, and the tip portion of the cantilever 112 rotates about the axis Q in the clockwise (CW) direction. If the intensities of voltages are reversed, i.e. $V_1 < V_2$, the cantilever 112 rotates in the anticlockwise (ACW) direction. Hereinafter, these rotational mode controls are referred to as "CW rotational mode control" and "ACW rotational mode control".

On the other hand, if voltages $V_1$, $V_1$, $V_2$ and $V_2$ ($V_1 > V_2$) are applied to the electrodes 150a, 150b, 150c and 150d, the lengths of the piezoelectric layers become la=lb>lc=ld, and the tip portion of the cantilever 112 warps downwards. If the intensities of voltages are reversed, i.e. $V_1 < V_2$, the tip portion of the cantilever 112 warps upwards. These displacement mode controls are referred to as "UP displacement control" and "DOWN displacement control".

The operation of the above apparatus will now be described with reference to FIGS. 17 and 18.

Prior to measurement, the photodetector 132 and rotational mirror 140 are situated in predetermined initial positions. Specifically, the photodetector 132 is situated by means of the fine movement device 143 to such a position that the output $S\delta$ becomes 0 when the probe/sample distance takes the value at point C in FIG. 16 and the cantilever 112 is displaced by $\delta_0$. This positioning is carried out based on a predetermined scale (not shown). In addition, the angle of the rotational mirror 140 is determined according to a predetermined scale (not shown) so that the output $S\theta$ from the photodetector 132 becomes 0 when the probe 114 receives shearing force $T_0$ from the sample 134 and the cantilever 112 rotates by $\theta_0$.

In measurement, the probe 114 provided at the tip portion of the cantilever 112 is approached, along with the lower silicon substrate 122, to the sample 134 by means of the rough movement device 138 attached to the piezoelectric actuator 136. While the probe 114 is being approached to the sample 134, the output $S\delta$ from the photodetector 132 is monitored, and, when the output $S\delta$ has become 0, the rough movement device 138 is stopped. In this case, a repulsive force corresponding to point C in FIG. 16 acts on the probe 114 and the cantilever 112 shifts downwards by $\delta_0$.

Then, the probe 114 is scanned in the x-direction by means of a conventional XY-scanning device (not shown). The probe/sample distance varies in accordance with the surface configuration of the sample 134. Accordingly, the inter-atomic force acting on the probe 114 varies and also the amount of displacement of the cantilever 112 varies. As the amount of displacement of the cantilever 112 varies, the location at which the laser beam is incident on the photodetector 132 is altered so that an output $S\delta$ ($\neq 0$) is generated. The output $S\delta$ is input to a Z-servo circuit (not shown). The output from the Z-servo circuit is input to the piezoelectric actuator 136 to carry out servo control so as to keep the displacement $\delta_0$ constant. Accordingly, an image of the surface configuration of the sample 134 is formed on the basis of the output signal from the z-servo circuit.

On the other hand, during the scanning, the probe 114 receives a shearing force T from the sample 134 and the cantilever 112 is rotated. The rotational displacement of the cantilever 112 is detected as output $S\theta$ from the photodetector 132. The output $S\theta$ is initialized to have the value "0" when the probe 114 receives the shearing force $T_0$. Accordingly, when the shearing force having a value different from $T_0$ is exerted to the probe 114, the output $S\theta$ ($\neq 0$) is generated. The signal $S\theta$ is input to the $\theta$ servo circuit (not shown) connected to the bimorphs 144A and 144B.

In this embodiment, the operation range of the probe 114 is set to the region of repulsive force; however, it can be set to the region of attractive force. In addition, since the displacement of the cantilever 112 is servo-controlled in the Z-direction to value $\delta_0$, the cantilever 112 can operate in a wide range, unlike the above-described embodiment. It is also possible to adjust, in the initializing process, the rotational mirror 140 so as to set the output $S\delta$ at 0, by controlling in advance the bimorphs 144A and 144B in the rotational mode and rotating and fixing the probe 114 such that the side surface of the probe 114 becomes vertical to the sample surface.

A seventh embodiment of the present invention will now be described with reference to FIG. 20, in comparison to the sixth embodiment.

The cantilever 112 has two bimorphs 152 and 154 extending in the longitudinal direction. Each of the bimorphs 152 and 154 has a structure as shown in FIG. 19. Each bimorph is connected to a driving circuit (not shown) for warp mode control. One of the driving circuits is provided with an input Id for controlling the reflection angle of the reflection mirror 116 of cantilever 112 and an input It for the rotational mode control. The other driving circuit is provided with an input Ic for carrying out the DOWN displacement control to a degree corresponding to the degree of the UP displacement control which is carried out on the one driving circuit. The input Ic is connected to the output $S\delta$ from the photodetector 132. While the reflection angle of the reflection mirror 116 is kept constant, the probe 114 is moved in the Z-direction. The input It is connected to the output $S\theta$ of the photodetector 132 via the aforementioned $\theta$ servo circuit. Part of the lower silicon substrate 122 situated below the probe 114 is provided with an opening 156, thereby making it possible to optically observe the sample by use of an objective lens system. In FIG. 20, those elements which are the same as or equivalent to elements of the aforementioned embodiments (such as reflection surfaces 128 and 130) are denoted by the same reference numerals.

The operation of the above embodiment will now be described. When the probe 114 is approached to the sample 134 by use of a rough movement device (not shown), an inter-atomic force acts between the probe 114 and the sample 134. The cantilever 112 is displaced upwards, for example, by $\delta_0$, and the photodetector 132 outputs signal $S\delta$. At this time, the rough movement device is stopped. The probe 114 is moved in the XY-directions by means of an XY-scanning device (not shown) and the Z-directional servo control is effected. When the probe 114 moves and the distance between the probe 114 and the surface of the sample 134 decreases, the attractive force acting on the probe 114 increases and the cantilever 112 displaces upwards further. The bimorph 152 is subjected to the DOWN displacement control, and the bimorph 154 is subjected to the UP displacement control. Thus, the reflection angle of the reflection mirror is restored to the original angle, and the inter-atomic force acting on the probe 114 is kept at a predetermined value. On the other hand, when the shearing force T is exerted by the sample 134, the output $S\theta$ is fed to the input Id via the $\theta$ servo circuit so that the driving circuit carries out the rotational mode control. If the start point of the servo operation is set to the displacement of the cantilever 112 in accordance with a predetermined inter-atomic force acting on the cantilever 112, the Z-servo circuit and $\theta$ servo circuit generate data relating to the configuration of the sample 134 and the shearing force when a predetermined inter-atomic force acts.

Figure 21:
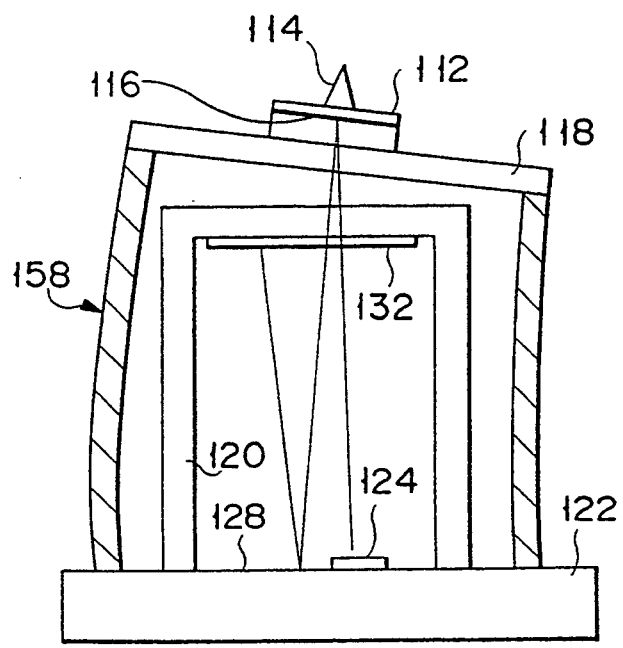
FIG. 21 and FIG. 22 show an eighth embodiment of the atomic probe microscope of the present invention.
Figure 22:
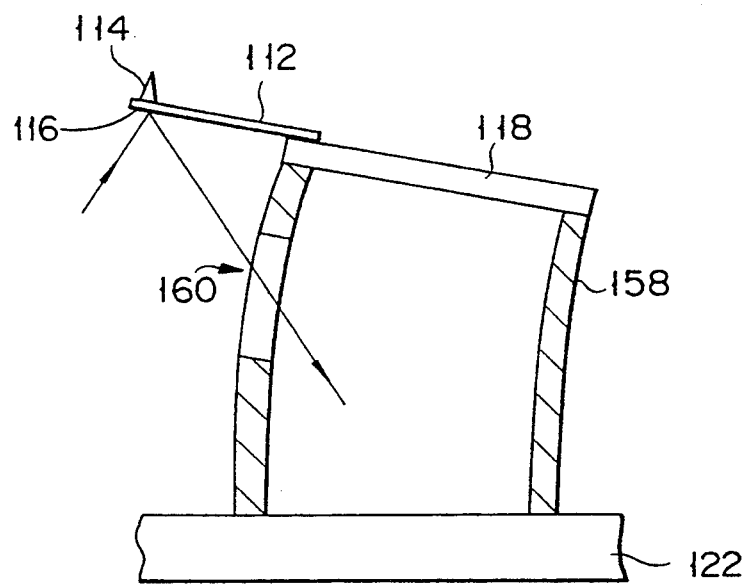

An eighth embodiment of the invention will now be described with reference to FIGS. 21 and 22. In FIGS. 21 and 22, numeral 158 denotes a conventional cylindrical piezoelectric actuator attached to a lower silicon substrate 122. Part of the side surface of the actuator 158 is provided with an opening 160 through which a laser beam is introduced. An intermediate block 120 having a photodetector 132 is provided within the actuator 158. A cantilever 112 having a probe 114 and a reflection mirror 116 at its end portion is provided on an upper silicon substrate 118 formed at the upper part of the actuator 132.

The cylindrical piezoelectric actuator 158 has a common electrode on its inner wall, and an electrode situated on its outer wall and divided into four parts along the longitudinal axis of the actuator 158. The cantilever 112 can be displaced in the $\theta$-direction, $\gamma$-direction and Z-direction by a conventional electrode voltage applying method. This function corresponds to the function of the bimorphs 144A and 144B and piezoelectric actuator 136 in the above-described embodiment. The cylindrical piezoelectric actuator may be replaced by four rod-shaped or plate-shaped actuators.

Figure 23:
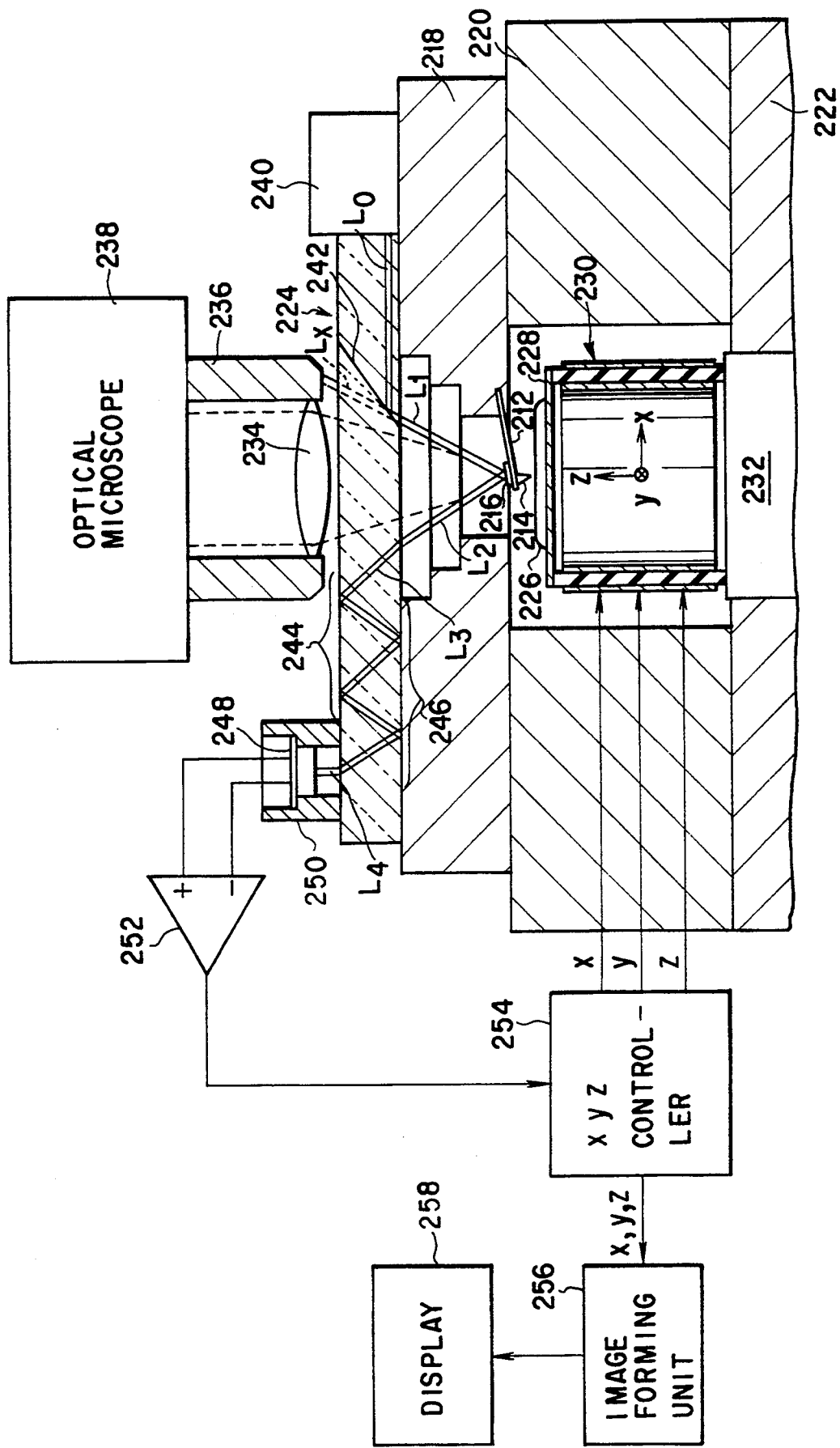
FIG. 23 shows a ninth embodiment of the atomic probe microscope of the invention.

The ninth embodiment of the invention will be explained with reference to FIG. 23. As is shown in FIG. 23, a cantilever 212 has an end fixed to a stationary table 218 and a free end provided with a probe 214 on its lower surface and a mirror 216 on its upper surfaces. The stationary table 218 is made of glass, ceramics or the like, and has a stepped circular opening formed in the center thereof. The upper end of the opening has a diameter larger than the lower end. The probe 214 is located in a substantial center of the opening. The stationary table 218 is supported by a support table 220 provided on a base 222. A thin glass member 224 is placed on the stationary table 218. The base 222 is placed preferably on an anti-vibration device (not shown). For enhancing the rigidity, the support table 220, stationary table 218, and glass member 224 are made compact, and are to be secured to one another at the time of measurement. They are secured by, for example, providing electromagnetic members made of soft iron at the contact portions, and exciting them, or by forming a fine hole through the stationary table 218, connected to a vacuum device, thereby attaching the glass member 224 and support table 220 to the stationary table 218. A sample 226 is on a sample stage 228 arranged on the upper end of an xyz scanner such as a cylindrical piezoelectric actuator 230 for displacing the sample 226 in the x, y, and z directions. The piezoelectric actuator 230 is arranged on a rough movement device 232 for displacing the actuator in the z direction. An optical microscope 238 is arranged above the sample 226, for optically observing the sample through the glass member 224. The optical microscope 238 includes an objective lens 234 arranged in the vicinity of the glass member 224. The glass member 224 has an end face to which a laser light source 240 is secured. The source 240 emits a laser beam $L_0$ into the glass member 224 such that the beam passes parallel with the upper and lower inner surface of the member 224. The laser beam $L_0$ is reflected by an optical mirror 242 arranged in the interior of the glass member 224. The laser beam $L_1$ reflected by the mirror 242 is guided to and reflected by a mirror 216 mounted on the free end of the cantilever 212. The laser beam $L_2$ reflected by the mirror 216 enters into the glass member 224. The laser beam $L_3$ having entered into the member 224 is reflected as shown in the figure by reflection films 244 and 246 formed on the inner upper and lower surfaces of the member 224, respectively, and is then guided to the outside of the member 224. The laser beam $L_4$ guided to the outside enters into a light receiving element 248 for dividing the laser beam into two beams. The element 248 is supported by a support member 250 movably arranged on the glass member 224, and has two light receiving portions each generating an output indicative of the intensity of light received. These outputs are supplied to a comparator 252, which in turn supplies an xyz controller 254 with a signal indicating the difference between the outputs of the receiving portions. The xyz controller 254 supplies a cylindrical piezoelectric actuator 230 with a z signal for adjusting the z-direction position of the sample 226 so as to control the distance between the probe 214 and sample 226 in response to a signal output from the comparator 252. The controller 254 also supplies the actuator 230 with x and y signals for adjusting the position of the sample 226 in the x and y directions, respectively, so as to perform x- and y-direction scanning. These x, y, and z signals are input to an image-forming unit 256. The unit 256 forms an image of the sample 226 in response to the input x, y, and z signals, and the image is displayed on a display device 258.

Then, the procedure of measurement will be explained. First, the optical microscope 238 and base 222 are moved relative to each other with the sample 226 optically observed by using the optical microscope 238, thereby determining the observation position. Then, the stationary table 218 is moved to thereby align the probe 214 with the observation position. Subsequently, the glass member 224 is moved in the x and y directions so that the laser beam $L_1$ reflected by the optical mirror 242 can be appropriately guided onto the mirror 216 mounted on the free end of the cantilever 212. Thereafter, the sample 226 is moved close to the probe 214 by using the rough movement device 232 and actuator 230, so as to displace the cantilever 212 by an appropriate amount. At this time, the support member 250 is moved in the x and y directions, to thereby position the light receiving element 248 so that the laser beam $L_4$ uniformly enters into the two light receiving portions, i.e., the output of the comparator 250 is 0. Then, the probe 214 is moved in the x and y directions, obtaining an image of the sample 226.

The system according to the above embodiment has the optical microscope 238 for optically observing the sample 226. Further, in that technique of detecting a displacement of the cantilever which is employed in the embodiment, it does not prefer that the incident angle of the laser beam at the mirror mounted on the free end of the cantilever is set so large. Accordingly, for obtaining the laser beam $L_1$ by a usual technique, the laser beam has to be guided along a path $L_x$ as indicated by the broken line. In this case, however, a support member 236 supporting an objective lens 234 is a hindrance to the laser path, and hence the laser beam $L_1$ is not obtained. In the embodiment, the detection system for detecting a displacement of the cantilever 212 is made as small as is interposed between the objective lens 234 and sample 226.

A tenth embodiment will be explained referring to FIG. 24.

In the figure, members similar to those employed in the ninth embodiment are denoted by the same numerals. In this embodiment, a cantilever 212 is horizontally secured to a stationary table 218. An optical block 260 is mounted on a glass member 224. An end of an optical fiber 264 is optically coupled with the optical block 260 by means of a fixing member 262. The other end of the fiber 264 is coupled with an interferometer 266. The interferometer 266 includes a light source 267 which emits coherent light. In the glass member 224, optical mirrors 268 and 270 are provided below the optical fiber 264 and objective lens 234, respectively. The mirrors 268 and 270 each incline at 45°, relative to the upper and lower surfaces of the glass member 224, and are parallel with each other. Preferably, the mirror 270 has a reflecting function only in an area 272 so as not to narrow the visual field of the optical microscope 238.

A laser beam L emitted from the interferometer 266 is guided through the optical fiber 264, and enters into the glass member 224 via the optical block 260. The laser beam L is then reflected by the optical mirrors 268 and 270, and subsequently guided to the mirror 216 provided on the free end of the cantilever 212. The laser beam L is reflected by the mirror 216, then again reflected by the mirrors 270 and 268, and then returned to the interferometer 266 through the optical fiber 264. The interferometer 266 detects a displacement in the free end of the cantilever 212, i.e., a displacement in the probe 214, thereby supplying the xyz controller 254 with a signal indicative of the displacement. The controller 254 controls the xyz scanner 230 to drive the probe 214 to scan the surface of the sample 226, and also controls the scanner 230 in response to a signal output from the interferometer 266, so as to keep constant the distance between the probe 214 and sample 226 at the time of the scanning. The control signal supplied from the xyz controller 254 to the xyz scanner 230 is also supplied to the image-forming unit 256, which in turn outputs information based on the control signal and indicative of an image of the sample 226. This image information is stored in a memory (not shown) or displayed on an image display device (not shown).

An eleventh embodiment will now be explained with reference to FIG. 25.

This embodiment is basically identical to the ninth embodiment. FIG. 25 shows that essential part of the eleventh embodiment which differs from that of the ninth embodiment. In the figure, members similar to those employed in the ninth embodiment are denoted by the same numerals. A glass member 224 has an opening 274 formed in a portion thereof located below an objective lens 234. The peripheral wall defining the opening 274 has a transmission surface 276 extending perpendicular to the upper and lower surfaces, and a reflection surface 278 inclining at a predetermined angle to the upper and lower surfaces. A laser beam L emitted from a light source 240 is guided through the glass member 224 in parallel with the upper and lower surfaces thereof. Subsequently, the beam L passes the transmission surface 276 and is reflected by the reflection surface 278, toward a mirror 216 mounted on the free end of a cantilever 212. The beam L is then reflected by the mirror 216, and enters into a light receiving element 248 for dividing the beam L into two beams. The output of the light receiving element 248 is processed as in the ninth embodiment.

A twelfth embodiment will be explained referring to FIG. 26. In the figure, members similar to those employed in the eleventh embodiment are designated by the same numerals. A glass member 224 has an opening 274 formed in a portion thereof located below an objective lens 234. The peripheral wall defining the opening 274 has a transmission surface 280 inclining at a predetermined angle to the upper and lower surfaces. A displacement detection unit 284 is provided above the objective lens 234, and an optical microscope 238 is provided on an end of the detection unit 284 remote from the objective lens 234. The detection unit 284 has a beam splitter 282 located above the objective lens 234. The splitter 282 causes an observation light O to enter into the optical microscope 238, and a laser beam L to be reflected toward the light receiving element 248.

The laser beam L is emitted from a light source 240 is guided through the glass member 224 in parallel with the upper and lower surfaces thereof. Subsequently, the beam L enters into the transmission surface 280 at an incident angle of $\alpha$, goes out of the surface 280 at a refractive angle of $\beta$, and is directed toward a mirror 216 mounted on the free end of a cantilever 212. The beam L is then reflected by the mirror 216, and enters into the objective lens 234. Thereafter, the beam L is reflected by the beam splitter 282, and then directed to a light receiving element 248 for dividing the beam L into two beams. The output of the light receiving element 248 is processed as in the ninth embodiment.

Finally, a thirteenth embodiment will be explained with reference to FIG. 27. This embodiment is basically identical to the tenth embodiment. FIG. 27 shows only an essential part of the thirteenth embodiment. A glass member 224 has a depression at the center thereof in which an objective lens 234 is arranged. An intermediate glass member 286 is movably arranged on that projecting portion of the member 224 which is located above an optical mirror 268. The intermediate glass member 286 has a semispherical depression at the center thereof, in which a semiconductor laser unit 288 is received. The laser unit 288 has a semiconductor laser 290 having its beam emitting surface secured to the plane end of a semispherical glass member 294. The spherical surface of the member 294 is slidably fitted in the depression of the intermediate glass member 286 by using silicon oil, etc., so that the direction of the laser 290 can be varied. A cylindrical envelope 296 enclosing the laser 290 has an end secured to the semispherical glass member 294 and the other end provided with a detector 298 for detecting the intensity of light output from the cleavage surface 292 of the semiconductor laser 290.

The laser beam emitted from the semiconductor laser 290 is reflected by the optical mirrors 268 and 270, then reflected by a mirror 216 mounted on a cantilever 212, then again reflected by the optical mirrors 270 and 268, and then returned to the laser 290. Thus, a Febry-Pérot interferometer is constituted by the cleavage surface 292 of the laser 290 and mirror 216. When the probe 214 is moved by a force acting upon it, the mirror 216 on the cantilever 212 is moved, thereby varying the distance between the mirror 216 and cleavage surface 292. Accordingly, the intensity of light output from the cleavage surface 292 is changed. The detector 298 detects the change of the intensity, and hence detects a displacement in the cantilever 212.

The position and direction of the semiconductor unit 288 is adjusted in consideration of the reference position of the cantilever 212 assumed at the time of measurement, i.e., assumed when an inter-atomic force acts upon the probe 214, thereby slightly moving the cantilever 212. For example, when the reference position of the cantilever 212 is a depression angle of $\alpha_2$, the semiconductor laser unit 288 is positioned as indicated by the broken line in FIG. 27, inclined by an angle of $\alpha_2$. On the other hand, when the reference position of the cantilever 212 is a depression angle of $\alpha_1$, the semiconductor laser unit 288 is positioned as indicated by the solid line (i.e., the unit 288 is shifted to the right by a distance of $X_1$ from the above-described position), inclined by an angle of $\alpha_1$.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. An atomic probe microscope for observing a surface of a sample, comprising:

a probe having a pointed tip, the tip being arranged to be spaced away from a surface of a sample by a distance where an inter-atomic force occurs between atoms at the tip and on the surface of the sample;

an elastic cantilever having a free end and a fixed end, the free end having one plane surface provided with the probe and another plane surface provided with an optical reflecting surface, the position of the free end being varied in response to the inter-atomic force;

support means for supporting the fixed end of the cantilever;

light source means for emitting a light beam;

directing means, arranged above the cantilever, for directing the light beam substantially in parallel with the surface of the sample;

deflection means for deflecting the light beam toward the optical reflecting surface of the cantilever;

displacement detection means for detecting a displacement of the free end of the cantilever on the basis of the reflected light beam on the optical reflecting surface;

scanning means for scanning the probe across the surface of the sample;

control means for controlling the distance between the tip and the surface of the sample in response to the displacement detected by the displacement detection means; and image-forming means for forming an image of the sample on the basis of information indicative of the position of the probe obtained from the scanning means and from the control means, wherein the atomic probe microscope is combined with an optical microscope and the directing means is arranged between the sample and an objective lens of the optical microscope.

2. The atomic probe microscope according to claim 1, wherein the deflection means includes an optical mirror provided in the guide means.

3. The atomic probe microscope according to claim 2, wherein:

the optical mirror is arranged to reflect the light beam to be obliquely incident on the optical reflection surface of the cantilever; and the displacement detection means includes:
a light receiving element having two light receiving portions, each of which outputs a signal indicative of an intensity of an incident light beam, and
a comparator which detects a difference between outputs from the two light receiving portions.

4. An atomic probe microscope for observing a surface of a sample, comprising:

a probe having a pointed tip, the tip being arranged to be spaced away from a surface of a sample by a distance where an inter-atomic force occurs between atoms at the tip and on the surface of the sample;

an elastic cantilever having a free end and a fixed end, the free end having one plane surface provided with the probe and another plane surface provided with an optical reflecting surface, the position of the free end being varied in response to the inter-atomic force;

support means for supporting the fixed end of the cantilever;

light source means for emitting a light beam;

guide means, arranged above the cantilever, for guiding the light beam substantially in parallel with the surface of the sample;

deflection means for deflecting the light beam toward the optical reflecting surface of the cantilever;

displacement detection means for detecting a displacement of the free end of the cantilever on the basis of the reflected light beam on the optical reflecting surface;

scanning means for scanning the probe across the surface of the sample;

control means for controlling the distance between the tip and the surface of the sample in response to the displacement detected by the displacement detection means; and image-forming means for forming an image of the sample on the basis of information indicative of the position of the probe obtained from the scanning means and from the control means, wherein the guide means comprises:

a plate member arranged in parallel with the surface of the sample, the plate member including an optically transparent portion which has an entrance surface on which the light beam enters and which allows propagation of the light beam therethrough; and supporting means for supporting the plate member above the cantilever.

5. An atomic probe microscope for observing a surface of a sample, comprising:

a probe having a pointed tip., the tip being arranged to be spaced away from a surface of a sample by a distance where an inter-atomic force occurs between atoms at the tip and on the surface of the sample;

an elastic cantilever having a free end and a fixed end, the free end having one plane surface provided with the probe and another plane surface provided with an optical reflecting surface, the position of the free end being varied in response to the inter-atomic force;

support means for supporting the fixed end of the cantilever;

light source means for emitting a light beam;

guide means, arranged above the cantilever, for guiding the light beam substantially in parallel with the surface of the sample;

deflection means for deflecting the light beam toward the optical reflecting surface of the cantilever;

displacement detection means for detecting a displacement of the free end of the cantilever on the basis of the reflected light beam on the optical reflecting surface;

scanning means for scanning the probe across the surface of the sample;

control means for controlling the distance between the tip and the surface of the sample in response to the displacement detected by the displacement detection means; and image-forming means for forming an image of the sample on the basis of information indicative of the position of the .probe obtained from the scanning means and from the control means, wherein the guide means comprises:

a plate member arranged in parallel with the surface of the sample, the plate member including an optically transparent portion which has an entrance surface on which the light beam enters and which allows propagation of the light beam therethrough; and supporting means for supporting the plate member above the cantilever, wherein:

the supporting means comprises a table having a surface substantially parallel with the surface of the sample; and the plate member is slidably mounted on the surface of the table.

6. An atomic probe microscope for observing a surface of a sample, comprising:

a probe having a pointed tip, the tip being arranged to be spaced away from a surface of a sample by a distance where an inter-atomic force occurs between atoms at the tip and on the surface of the sample;

an elastic cantilever having a free end and a fixed end, the free end having one plane surface provided with the probe and another plane surface provided with an optical reflecting surface, and the position of the free end being varied in response to the inter-atomic force;

support means for supporting the fixed end of the cantilever;

light source means for emitting a light beam;

guide means, arranged above the cantilever, for guiding the light beam substantially in parallel with the surface of the sample;

deflection means for deflecting the light beam toward the optical reflecting surface of the cantilever;

displacement detection means for detecting a displacement of the free end of the cantilever on the basis of the reflected light beam from the optical reflecting surface;

scanning means for scanning the probe across the surface of the sample;

control means for controlling the distance between the tip and the surface of the sample in response to the displacement detected by the displacement detection means;

image-forming means for forming an image of the sample on the basis of information indicative of the position of the probe obtained from the scanning means and from the control means;

wherein the guide means comprises:
a plate member arranged in parallel with the surface of the sample, the plate member including an optically transparent portion which has an entrance surface on which the light beam enters and which allows propagation of the light beam therethrough; and supporting means for supporting the plate member above the cantilever; and wherein the plate member includes transmission means for allowing of transmission of light at a portion opposed to the surface of the sample; and an optical microscope which obtains an optical image of the surface of the sample, the optical microscope including an objective lens arranged opposed to the surface of the sample, with the plate member interposed between the objective lens and the surface of the sample.

7. The atomic probe microscope according to claim 6, wherein:
the transmission means of the plate member includes an optically transparent member; and
the deflection means includes an optical mirror provided in the plate member.

8. The atomic probe microscope according to claim 7, wherein:
the optical mirror is arranged to reflect the light beam to be obliquely incident on the optical reflection surface of the cantilever; and
the displacement detection means includes:
a light receiving element having two light receiving portions, each of which outputs a signal indicative of an intensity of an incident light beam, and
a comparator which detects a difference between outputs from the two light receiving portions.

9. The atomic probe microscope according to claim 8, wherein:
the optically transparent portion of the plate member comprises another entrance surface on which the light beam enters reflected by the optical reflection surface of the cantilever, and an outgoing surface out of which the entered light beam goes; and
the plate member includes confining means for confining the light beam within the optically transparent portion.

10. The atomic probe microscope according to claim 9, wherein the confining means comprises a reflection surface provided on an interface of the optically transparent portion.

11. The atomic probe microscope according to claim 10, wherein:
the light source means is optically coupled to the entrance surface; and
the light receiving element is slidably mounted on the outgoing surface of the plate member.

12. The atomic probe microscope according to claim 6, wherein:
the deflection means includes means for deflecting the light beam to be obliquely incident on the optical reflection surface of the cantilever so that the reflected light beam from the optical reflection surface enters into the objective lens; and
the displacement detection means includes:
a light receiving element having two light receiving portions each of which outputs a signal indicative of an intensity of the light beam,
another deflection means for deflecting the light beam passing through the objective lens toward the light receiving element, and
a comparator which detects a difference between outputs from the two light receiving portions.

13. The atomic probe microscope according to claim 12, wherein said another deflecting means includes a beam splitter means for passing therethrough a portion of the light beam which passed through the objective lens as observation light having information as to an optical image of the surface of the sample, and for reflecting another portion of the light beam which passed through the objective lens.

14. The atomic probe microscope according to claim 7, wherein:
the optical mirror is arranged to reflect the light beam to be perpendicularly incident on the reflection surface of the cantilever, such that the reflected light beam from the reflection surface returns along the path of the incident light beam;
the light source includes source means for emitting a coherent light;
the displacement detection means comprises an interferometer including the light source and disposed to detect a displacement of the reflection surface of the cantilever by causing the light beam emitted from the light source and the returned light beam, to interfere with each other.

15. The atomic probe microscope according to claim 14, wherein the interferometer is optically coupled to an entrance surface by means of an optical fiber.

16. The atomic probe microscope according to claim 7, wherein:
the optical mirror is arranged to reflect the light beam to be perpendicularly incident on the reflection surface of the cantilever, such that the reflected light beam from the reflection surface returns along the path of the incident light beam;
the light source includes a semiconductor laser provided with an outgoing surface from which the light beam is emitted and with a cleavage surface opposed to the outgoing surface; and
the displacement detection means includes a detector arranged opposed to the cleavage surface of the semiconductor laser for detecting that intensity of light emitted from the cleavage surface which corresponds to a displacement of the reflection surface of the cantilever, the cleavage surface forming a Fabry-Pérot interferometer together with the reflection surface of the cantilever.

17. The atomic probe microscope according to claim 16, wherein the displacement detection means comprises:
an optically transparent semispherical member having a flat end face coupled with the outgoing surface of the semiconductor laser; and
an optically transparent intermediate member having a depression in which the semispherical member is slidably fitted, and slidably arranged on an entrance surface.

18. The atomic probe microscope according to claim 17, wherein:
the entrance surface is provided on an upper side of the plate member; and
the plate member includes another optical mirror which deflects the incident light beam to propagate along a direction which is substantially parallel with the surface of the sample.

19. The atomic probe microscope according to claim 6, wherein:
the transmission means comprises an opening formed in the plate member;
the deflecting means includes means for deflecting the light beam to be obliquely incident on the reflection surface of the cantilever; and
the displacement detection means includes:
a light receiving element having two light receiving portions each of which outputs a signal indicative of an intensity of the incident light beam, and
a comparator which detects a difference between outputs from the two receiving portions.

20. The atomic probe microscope according to claim 19, wherein the deflecting means includes an optical mirror provided on a surface defining the opening of the plate member.

21. The atomic probe microscope according to claim 20, wherein:
the plate member includes a transmission surface provided on a surface defining the opening from which the light beam is output; and
the optical mirror is provided on that surface defining the opening which is opposed to the transmission surface.

22. The atomic probe microscope according to claim 19, wherein the deflecting means includes a transmission surface formed on a surface defining the opening, which is oblique to the incident light beam so as to refract the light beam toward the reflection surface of the cantilever.

23. The atomic probe microscope according to claim 19, wherein:
the optically transparent portion of the plate member comprises another entrance surface on which the light beam reflected by the reflection surface of the cantilever enters, and an outgoing surface out of which the entered light beam goes; and
the plate member includes confining means for confining the entered light beam within the optically transparent portion.

24. The atomic probe microscope according to claim 23, wherein the confining means includes a reflection surface provided on the interface of the optically transparent portion.

25. The atomic probe microscope according to claim 24, wherein:
the light source is optically coupled to the entrance surface; and
the light receiving element is slidably mounted on the outgoing surface of the plate member.

26. The atomic probe microscope according to claim 19, wherein:
the deflection means includes means for deflecting the light beam to be obliquely incident on the reflection surface of the cantilever so that the reflected light beam from the reflection surface enters into the objective lens; and
the displacement detection means includes:
a light receiving element having two light receiving portions each of which outputs a signal indicative of an intensity of the light beam,
another deflection means for deflecting the light beam passing through the objective lens toward the light receiving element, and
a comparator which detects a difference between outputs from the two light receiving portions.

27. The atomic probe microscope according to claim 26, wherein said another deflecting means includes a beam splitter means for passing therethrough a portion of the light beam which passed through the objective lens as observation light having information as to an optical image of the surface of the sample, and for reflecting another portion of the light beam which passed through the objective lens.

* * * * *